(12) United States Patent
Mongrain et al.

(10) Patent No.: US 10,590,606 B2
(45) Date of Patent: Mar. 17, 2020

(54) COATED PAPER-BASED SUBSTRATE FOR CONTAINERS AND PROCESS FOR MAKING THE SAME

(71) Applicant: CASCADES SONOCO INC., Kingsey Falls (CA)

(72) Inventors: Yvon Mongrain, Lavaltrie (CA); Émilie Allen, Kingsey Falls (CA)

(73) Assignee: CASCADES SONOCO INC., Kingsey Falls, Quebec (CA)

( * ) Notice: Subject to any disclaimer, the term of this patent is extended or adjusted under 35 U.S.C. 154(b) by 131 days.

(21) Appl. No.: 15/686,269

(22) Filed: Aug. 25, 2017

(65) Prior Publication Data

US 2018/0058010 A1  Mar. 1, 2018

(30) Foreign Application Priority Data

Aug. 25, 2016 (CA) ...................................... 2940370

(51) Int. Cl.
*D21H 19/84* (2006.01)
*D21H 27/10* (2006.01)
(Continued)

(52) U.S. Cl.
CPC ............ *D21H 19/84* (2013.01); *D21H 19/12* (2013.01); *D21H 19/56* (2013.01); *D21H 19/62* (2013.01);
(Continued)

(58) Field of Classification Search
None
See application file for complete search history.

(56) References Cited

U.S. PATENT DOCUMENTS

| 1,824,885 A | 9/1931 | Hammond |
| 2,994,465 A | 8/1961 | Kauffeld |

(Continued)

FOREIGN PATENT DOCUMENTS

| EP | 1582557 B1 | 3/2009 |
| FR | 2098610 | 3/1972 |

(Continued)

OTHER PUBLICATIONS

Findenig, G. et al., Creating Water Vapor Barrier Coatings from Hydrophilic Components, ACS Applied Materials & Interfaces, ACS Publications, vol. 4 No. 6, p. 3199-3206, 2012 (Abstract).

(Continued)

*Primary Examiner* — Chinessa T. Golden
(74) *Attorney, Agent, or Firm* — Eversheds Sutherland (US) LLP

(57) ABSTRACT

A coated paper-based substrate for manufacturing a container and a method for preparing the same. The coated paper-based substrate comprises a cellulosic fiber-based substrate coated on a first surface with a coating A and coated on a second surface with a coating B. The coating A comprises at least one layer of an extruded or laminated polymeric film or of a laminated foil. The coating B comprises at least one layer obtained by applying an aqueous dispersion of at least one polymer or copolymer capable of providing a water and/or moisture barrier to the second surface of the paper-based substrate once coated. The extruded or laminated polymeric film and the polymer or copolymer of the aqueous dispersion are different. The coating A and the coating B are heat sealable to each other.

31 Claims, 6 Drawing Sheets

(51) Int. Cl.
*D21H 21/18* (2006.01)
*D21H 19/12* (2006.01)
*D21H 19/56* (2006.01)
*D21H 19/62* (2006.01)
*D21H 21/16* (2006.01)

(52) U.S. Cl.
CPC ............ *D21H 21/16* (2013.01); *D21H 21/18* (2013.01); *D21H 27/10* (2013.01); *Y02W 90/11* (2015.05)

(56) References Cited

U.S. PATENT DOCUMENTS

| | | | |
|---|---|---|---|
| 3,326,708 | A | 6/1967 | Hawkins |
| 4,446,273 | A * | 5/1984 | Hiyoshi ............... C09D 127/08 524/556 |
| 4,806,398 | A | 2/1989 | Martin, Jr. |
| 5,196,269 | A | 3/1993 | Kittrell et al. |
| 5,810,243 | A | 9/1998 | DiPinto et al. |
| 5,858,551 | A | 1/1999 | Salsman |
| 5,935,664 | A | 8/1999 | Claytor et al. |
| 6,133,168 | A | 10/2000 | Doyle et al. |
| 6,787,205 | B1 | 9/2004 | Aho et al. |
| 7,244,509 | B1 | 7/2007 | Seydel |
| 8,329,309 | B2 | 12/2012 | Leplatois et al. |
| 8,809,416 | B2 | 8/2014 | Schoenleitner et al. |
| 9,200,409 | B2 | 12/2015 | Hartmann et al. |
| 9,637,866 | B2 | 5/2017 | Tilton |
| 9,732,474 | B2 | 8/2017 | Koenig et al. |
| 2003/0127210 | A1 | 7/2003 | Pelletier et al. |
| 2003/0207054 | A1 | 11/2003 | Magnusson |
| 2004/0052987 | A1 | 3/2004 | Shetty et al. |
| 2005/0037162 | A1 | 2/2005 | Adams |
| 2006/0051537 | A1 | 3/2006 | Katayama et al. |
| 2006/0057315 | A1 | 3/2006 | De Coninck et al. |
| 2009/0152268 | A1 * | 6/2009 | Whiteman ............. B32B 27/10 220/62.13 |
| 2010/0062274 | A1 | 3/2010 | Leth |
| 2011/0027601 | A1 | 2/2011 | Ruffner, Jr. et al. |
| 2011/0046284 | A1 | 2/2011 | Berube et al. |
| 2013/0059048 | A1 | 3/2013 | Price et al. |
| 2013/0071677 | A1 | 3/2013 | Penttinen et al. |
| 2013/0225744 | A1 * | 8/2013 | Iyer ......................... C08L 9/08 524/399 |
| 2014/0274632 | A1 | 9/2014 | Tilton |
| 2015/0086734 | A1 | 3/2015 | Pietsch et al. |
| 2015/0314939 | A1 | 11/2015 | Häde et al. |
| 2016/0153149 | A1 | 6/2016 | Mongrain |
| 2016/0168799 | A1 | 6/2016 | Constant |
| 2017/0008264 | A1 | 1/2017 | Nevalainen et al. |

FOREIGN PATENT DOCUMENTS

| | | |
|---|---|---|
| WO | 2014172717 A2 | 10/2014 |
| WO | 2016/057969 A1 | 4/2016 |
| WO | 2016/183314 A1 | 11/2016 |

OTHER PUBLICATIONS

Bollstrom, R. et al., A multilayer coated fiber-based substrate suitable for printed functionality, Organic Electronics, vol. 10, p. 1020-1023, 2009.
Vartiainen, J. et al., Bio-based multilayer barrier films by extrusion, dispersion coating and atomic layer deposition, Journal of Applied Polymer Science, vol. 133, Issue 2, 2015 (Abstract).
Product Safety Assessment, "Adcote Water-Based Extrusion Primers", The Dow Chemical Company, Jan. 14, 2014, 5 pages, http://www.dow.com/productsafety/assess/finder.
Product News Network, "Water-Based Coating supports heat sealing and heat activation", ProQuest Dialog, Jan. 17, 2014, 2 pages.
Ginger Cushing, "Chemical Primers as Surface Modifiers for Film Substrates", Mica Corporation, Shelton, CT, USA, 6 pages.
Adhesive Raw Materials, "Epotal P100 ECO", BASF SE, Germany, Apr. 2015, 2 pages.
Packaging Coatings, "EvCote WaterBarrier", Akzo Nobel N.V., Amsterdam, The Netherlands, Copyright 2014, 13 pages.
D Robert Hammond, "Chemical Primers", Mica Corporation, 2010 Place Conference, Apr. 18-21, 2010, New Mexico, USA, 41 pages.
MarFlex Polyethylene, "MarFlex 4517", Chevron Phillips Chemical Company LP, The Woodlands, Texas, USA, Apr. 2011, 1 page.
Packaging and Converting, "Serfene 546 Barrier Adhesive", Rohm and Haas, Copyright 2007.
Base Coating, "Ulterion 323 BC", Technical Bulletin, Ulterion International, Inc., South Carolina, USA, 1 page.
Water Repellant Coating, "Ulterion 535 OPV", Technical Bulletin, Ulterion International, Inc., South Carolina, USA, 1 page.
Water Resistant Coating, "Ulterion 537 OPV", Technical Bulletin, Ulterion International, Inc., South Carolina, USA, 1 page.
Material Safety Data Sheet, "Hydraban 708.5", Michelman Asia-Pacific Pte. Ltd., Singapore, Feb. 26, 2013, 6 pages.
Material Safety Data Sheet, "Michem Coat 81", Mechelman, Inc., Cincinnati, Ohio, USA, Jun. 21, 2011, 6 pages.
Safety Data Sheet, "Acronal S504 na", BASF Canada Inc., Mississauga, Ontario, Canada, Jan. 11, 2011, 7 pages.
Material Safety Data Sheet, "Aquaban 2000 / IGI", Enviro-Coatings International Ltd., Philadelphia, USA, 3 pages.
Safety Data, "Styronal BN 4606X", BASF Canada Inc., Mississauga, Ontario, Canada, Mar. 26, 2010, 6 pages.
Material Safety Data Sheet, "Coating X300AF", Michelman, Inc., Cincinnati, Ohio, USA, Sep. 14, 2009, 6 pages.
Safety Data according to EU Regulation No. 1907/2006, "Aquacer 539", BYK-Cera bv, Deventer, Netherlands, Jun. 11, 2008, 6 pages.
Safety Data Sheet, "Mica R-1509-B", Mica Corporation, Shelton, Connecticut, USA, Sep. 11, 2013, 3 pages.
Material Safety Data Sheet, "Spectra-Guard 3003", Spectra-Kote Corporation, Gettysburg, Philadelphia, USA, Dec. 11, 2013, 3 pages.
Material Safety Data Sheet, "Spectra-Guard 3005", Spectra-Kote Corporation, Gettysburg, Philadelphia, USA, Dec. 11, 2013, 3 pages.
Safety Data Sheet, "Aquacer 1061", BYK USA Inc., Wallingford, Connecticut, USA, Aug. 23, 2016, 9 pages.
Material SafetyData Sheet, "Barrier-Grip 9471 series", The International Group, Inc, Titusville, Philadelphia, USA, 2 pages.
Material Safety Data Sheer, "Michemcoat 50 AFN", Michelman, Inc., Cincinnati, Ohio, USA, May 27, 2009, 6 pages.
Material Safety Data Sheet, "Spectra-Guard 3007BK", Spectra-Kote Corporation, Gettysburg, Philadelphia, USA, Jan. 24, 2014, 3 pages.
Material Safety Data Sheer, "Vaporcoat 2200R", Michelman, Inc., Cincinnati, Ohio, USA, May 10, 2013, 7 pages.
Safety Data Sheet, "Liquishield X22SM11P71", Actega North America, Inc., New Jersey, USA, Apr. 14, 2016, 9 pages.
Safety Data Sheet, "Epotal S 440", BASF SE, Germany, Dec. 16, 2016, 12 pages.
Product Regulatory Overview (PRO), "MarFlex 1017 Polyethylene", Chevron Phillips Chemical Company LP, Texas, USA, Jun. 18, 2015, 5 pages.
Extrusion Coating Grade Low Density Polyethylene, "MarFlex 1017", Chevron Phillips Chemical Company LP, Texas, USA, Apr. 2011, 1 page.
Global Marketing Biopolymers, "ecovio PS1606", BASF SE, Germany, Jan. 2014, 5 pages.

* cited by examiner

COATED PAPER-BASED SUBSTRATE FOR CONTAINERS AND PROCESS FOR MAKING THE SAME

RELATED APPLICATIONS

This application claims priority to Canadian application No. 2,940,370 filed on Aug. 25, 2016, the contents of which is incorporated herein by reference in its entirety for all purposes.

TECHNICAL FIELD

The technical field relates to coated paper-based substrates for manufacturing containers and to a process for making such coated paper-based substrates. The paper-based substrate is coated on both sides with coatings providing specific properties to the paper-based substrate.

TECHNICAL BACKGROUND

In the paper industry, and more particularly in the field of paper-based containers for foodstuff, such as milk carton, ice cream carton, soft drink or coffee cups to name a few, the containers are usually made from paper-based substrates coated on both surfaces with polyethylene coatings. Such polyethylene coatings allow the protection of the interior of the container, which is in contact with the foodstuff, and also the exterior of the container. For instance, polyethylene coatings on the exterior surface of the container provide protection against water condensation thereby limiting or avoiding deterioration of the carton when the foodstuff in the container is colder than ambient temperature. Polyethylene coatings on the interior surface of the container may provide protection against water and/or moisture and/or oil and/or grease. Foamed polyethylene coatings may also provide other features to the container such as heat transfer prevention when the foodstuff in the container is a hot foodstuff such as coffee for instance.

Polyethylene coatings are generally applied by extrusion onto the paper-based substrate. In some cases, a primer coating can be applied to the substrate before extrusion of the polyethylene to enhance adhesion thereof.

When erecting the container, a portion of the paper surface, which will face the interior of the container and be in contact with the goods therein (e.g. foodstuff), covers a portion of the other surface, which will form the exterior of the container, and the superimposed portions are "glued" together using heat and/or pressure. Good adhesion between the two coatings, through sealing, is required to maintain integrity of the container in use. Good sealing (through heat-sealing) is usually observed when the coatings are of the same nature on both surfaces of the paper-based substrate, such as for polyethylene coatings.

However, extruded polyethylene coatings commonly used in the field, are difficult to recycle and/or generally not repulpable and/or non-compostable and/or non-biodegradable, which makes them less environmental friendly.

Moreover, polyethylene coatings need to be corona treated to increase their surface tension in order to ease the printing on the surface of the coated substrate (e.g. on the exterior surface), requiring a further step in the coating process, the coating process being an in-line or an off-line process.

In view of the above, there is a need for coated paper-based substrates for manufacturing containers to hold goods such as foodstuff or any other type of goods, which would be able to overcome or at least minimize the above-discussed prior art concerns.

BRIEF SUMMARY

It is therefore an aim of the present invention to address the above-mentioned issues.

According to one aspect, there is provided a coated paper-based substrate for manufacturing a container. The coated paper-based substrate comprises a cellulosic fiber-based substrate coated on a first surface with a coating A and coated on a second surface with a coating B. The coating A comprises at least one layer of an extruded or laminated polymeric film or of a laminated foil. The coating B comprises at least one layer obtained by applying an aqueous dispersion of at least one polymer or copolymer capable of providing a water and/or moisture barrier to the second surface of the paper-based substrate once coated. The extruded or laminated polymeric film and the polymer or copolymer of the aqueous dispersion are different. The coating A and the coating B are heat sealable to each other.

In an embodiment, the polymer or copolymer of the coating B provides a water and/or moisture barrier to the second surface of the paper-based substrate once coated. In another embodiment, the polymer or copolymer of the coating B further provides an oil and/or grease barrier to the paper-based substrate.

In an embodiment, the aqueous dispersion comprises a polymer or copolymer selected from an acrylic- or acrylate-based polymer or copolymer such as styrene-acrylic copolymer and styrene-acrylic-acrylonitrile copolymer, polyester such as polyethylene terephthalate (PET), plant oil-based polyester resin, polyurethane, polyvinylidene chloride (PVDC), ethylene copolymer resin dispersion, paraffinic wax, styrene-butadiene copolymer, starch, dextrin, LDPE, HDPE, PLA, nylon, polypropylene and mixtures thereof.

In another embodiment, the aqueous dispersion further comprises mineral charges. The mineral charges may comprise calcium carbonate ($CaCO_3$), clay, mica, talc, titanium dioxide and/or carbon black.

In an embodiment, the aqueous dispersion is selected from the products Epotal® 100 (BASF), Serfene™ 546 (DOW), Actega® X22 (Altana), Michem®Coat 81 (Michelman), Vaporcoat 2200R (Michelman), Barrier-Grip R5701A (IGI Enviro-Coatings), Spectra-Guard™ 3003, 3005 or 3007BK (Spectra-Kote), HydraBan® products (Michelman), Aquaban® products (IGI), BYK Aquacer® products (BYK), MICA R-1509-B (Mica Corporation), Styronal® 4606 (BASF), Epotal® S440 (BASF), X300AF (Michelman), Michem®Coat 55 (Michelman) and Acronal® S504 (BASF).

In an embodiment, the surface tension of the coating B is from about 15 to about 60 dynes/cm. The surface tension of the coating B may be above about 38 dynes/cm.

In another embodiment, the layer of the extruded or laminated polymeric film or laminated foil provides an oil and/or grease and/or moisture and/or water barrier to the paper-based substrate once coated.

In an embodiment, the extruded or laminated polymeric film comprises a PE (e.g. mLLDPE, LDPE, HDPE or their mixtures), PLA, PBS, PP, PET, Nylon, PVDC, EvOH or a metallized film. In another embodiment, the coating A comprises at least one layer of a film of PE (e.g. mLLDPE, LDPE, HDPE or their mixtures), PBS or PLA.

In an embodiment, the extruded or laminated polymeric film comprises a food grade polymer. In another embodiment, the extruded or laminated polymeric film further comprises mineral charges. The mineral charges may comprise calcium carbonate ($CaCO_3$), clay, mica, talc, titanium dioxide and/or carbon black.

In an embodiment, the coating A comprises at least one layer of an extruded polymeric film of Ecovio® (BASF), PLA Ingeo™ biopolymer (Ingeo), BioPBS™ FZ91, FZ71 or FD92 (PTT MCC Biochem), MarFlex® 1017 (Chevron Phillips), or DOW™ Polyethylene 722 (Dow Plastics). The coating A may preferably comprise at least one layer of an extruded polymeric film of Ecovio® (BASF).

In an embodiment, the laminated foil comprises aluminium foil.

In an embodiment, the coating A further comprises a primer layer between the first surface of the cellulosic fiber-based substrate and the layer of the extruded or laminated polymeric film or the laminated foil. The primer layer may comprise a water based emulsion or dispersion of polymers or copolymers selected from acrylic-based polymers, acrylate-based polymers, styrene-butadiene copolymers, styrene-acrylic copolymers, styrene-acrylic-acrylonitrile copolymers, polyethylene imines, functionalized polypropylenes, polyurethanes, polyesters, ethylene-acrylic acid copolymers, modified ethylene copolymers and any mixture thereof.

In an embodiment, the coating A comprises a primer layer of a water based dispersion of a styrene-butadiene copolymer, styrene-acrylic copolymer, styrene-acrylic-acrylonitrile copolymer or polyester-polyurethane elastomer and a layer of an extruded film of PLA (e.g. Ecovio® PS 1606 from BASF) or LDPE (e.g. MarFlex® 1017 from Chevron Phillips). In another embodiment, the coating A comprises a primer layer of the product Actega® X22, Michem®Coat 81, Vaporcoat 2200R, Barrier-Grip R5701A, Spectra-Guard™ 3003, 3005 or 3007, HydraBan®708, Aquaban® 9001A, Aquacer®1061, MICA R-1509-B, Styronal® 4606, Epotal® S440, X300AF, Michem®Coat 55, or Acronal® S504 and a layer of an extruded film of PLA. The coating A may preferably comprise a primer layer of the product MICA R-1509-B and a layer of an extruded film of Ecovio® (BASF).

In an embodiment, the coating B further comprises an adhesion promotor to enhance heat sealing between the coatings A and B. The adhesion promotor may be present in the aqueous dispersion. In an embodiment, the adhesion promotor is applied as an additional layer onto the polymer or copolymer layer of the coating B. The adhesion promotor may comprise a polyethyleneimine (PEI) or derivatives thereof.

In an embodiment, the coating A comprises at least one layer of an extruded polymeric film of PE (e.g. mLLDPE, LDPE, HDPE or their mixtures) and the adhesion promotor of the coating B comprises a PEI.

In an embodiment, the cellulosic fiber-based substrate is a recycled or virgin liner, medium, fine paper, newspaper, chipboard, Kraftpak® paper, paperboard, molded pulp, bleached paperboard (i.e. SBS) or any other cellulosic fiber-based substrate, wherein the cellulosic fiber-based substrate is optionally coated (e.g. clay coated).

In an embodiment, the cellulosic fiber-based substrate has a basis weight from about 40 g/m² to about 1000 g/m². The cellulosic fiber-based substrate may preferably have a basis weight from about 200 g/m² to about 400 g/m².

According to another aspect, there is provided a process for preparing a coated paper-based substrate for manufacturing a container, wherein the coated paper-based substrate comprises a cellulosic fiber-based substrate coated on a first surface with a coating A and coated on a second surface with a coating B. The coating A comprises at least one layer of an extruded or laminated polymeric film or of a laminated foil. The coating B comprises at least one layer obtained by applying an aqueous dispersion of at least one polymer or copolymer. The extruded or laminated polymeric film and the polymer or copolymer of the aqueous dispersion are different, and the coating A and the coating B are heat sealable to each other. In an embodiment, the process comprises: applying the aqueous dispersion of the at least one polymer or copolymer; drying the aqueous dispersion to form the at least one layer of the polymer or copolymer; and applying by extrusion or lamination the layer of the polymeric film or laminating the foil on the first surface of the paper-based substrate.

In an embodiment, the aqueous dispersion comprises at least one polymer or copolymer capable of providing a water and/or moisture barrier on the second surface.

In an embodiment, the aqueous dispersion comprises a polymer or copolymer selected from a styrene-butadiene (SBR) or an acrylic- or acrylate-based polymer or copolymer such as styrene-acrylic copolymer and styrene-acrylic-acrylonitrile copolymer, polyester such as polyethylene terephthalate (PET), plant oil-based polyester resin, polyurethane, polyvinylidene chloride (PVDC), ethylene copolymer resin dispersion paraffinic wax, styrene-butadiene copolymer, starch, dextrin, LDPE, HDPE, PLA, nylon, polypropylene and mixtures thereof. The aqueous dispersion may further comprise mineral charges comprising calcium carbonate ($CaCO_3$), clay, mica, talc, titanium dioxide and/or carbon black.

In an embodiment, the aqueous dispersion is selected from the products, Epotal® 100 (BASF), Serfene™ 546 (DOW), Actega® X22 (Altana), Michem®Coat 81 (Michelman), Vaporcoat 2200R (Michelman), Barrier-Grip R5701A (IGI Enviro-Coatings), Spectra-Guard™ 3003, 3005 or 3007BK (Spectra-Kote), HydraBan® products (Michelman), Aquaban® products (IGI), BYK Aquacer® products, (BYK), MICA R-1509-B (Mica Corporation), Styronal® 4606 (BASF), Epotal® S440, (BASF), X300AF (Michelman), Michem®Coat 55 (Michelman), and Acronal® S504 (BASF).

In an embodiment, the surface tension of the coating B is from about 15 to about 60 dynes/cm. The surface tension of the coating B may be above about 38 dynes/cm.

In an embodiment, the layer of the extruded or laminated polymeric film or laminated foil provides an oil and/or grease and/or moisture and/or water barrier to the paper-based substrate once coated.

In another embodiment, the extruded or laminated polymeric film comprises a PE (e.g. mLLDPE, LDPE, HDPE or their mixtures), PLA, PBS, PP, PET, Nylon, PVDC or a metallized film. The extruded or laminated polymeric film may comprise a food grade polymer.

In an embodiment, the coating A comprises at least one layer of a film of PE (e.g. mLLDPE, LDPE, HDPE or their mixtures), PBS or PLA.

In an embodiment, the extruded or laminated polymeric film further comprises mineral charges. The mineral charges may comprise calcium carbonate ($CaCO_3$), clay, mica, talc, titanium dioxide and/or carbon black.

In an embodiment, the coating A comprises at least one layer of an extruded polymeric film of Ecovio® (BASF), PLA Ingeo™ biopolymer (Ingeo), BioPBS™ FZ91, FZ71 or FD92 (PTT MCC Biochem), MarFlex® 1017 (Chevron Phillips), or DOW™ Polyethylene 722 (Dow Plastics). The coating A may comprise at least one layer of an extruded polymeric film of Ecovio® (BASF).

In an embodiment, the laminated foil comprises aluminium foil.

In an embodiment, the process further comprises applying a primer layer on the first surface of the paper-based substrate before applying the layer of the polymeric film or laminating the foil.

In an embodiment, the primer layer comprises a water based emulsion or dispersion of polymers or copolymers selected from acrylic-based polymers, acrylate-based polymers, styrene-butadiene copolymers, styrene-acrylic copolymers, styrene-acrylic-acrylonitrile copolymers, polyethylene imines, functionalized polypropylenes, polyurethanes, polyesters, ethylene-acrylic acid copolymers, modified ethylene copolymers and any mixturethereof.

In an embodiment, the coating A comprises a primer layer of a water based dispersion of a styrene-butadiene copolymer, styrene-acrylic copolymer, styrene-acrylic-acrylonitrile copolymer or polyester-polyurethane elastomer and a layer of an extruded film of PLA. The coating A may comprise a primer layer of the product MICA R-1509-B, Michem® Flex P1822, Acronal® S 504 NA, Styronal® BN 4606, Epotal® S440 or Epotal® P100 ECO and a layer of an extruded film of PLA. The coating A may preferably comprise a primer layer of the product MICA R-1509-B and a layer of an extruded film of Ecovio® (BASF).

In an embodiment, the aqueous dispersion of the primer layer of the coating A and the aqueous dispersion of the coating B are the same and are applied on the first surface and second surface of the cellulosic fiber-based substrate, respectively.

In an embodiment, the coating B further comprises an adhesion promotor to enhance heat sealing between the coating A and the coating B. The adhesion promotor may be present in the aqueous dispersion.

In an embodiment, the process further comprises applying a layer of an adhesion promotor onto the polymer or copolymer layer on the second surface of the paper-based substrate. The process may further comprise drying the adhesion promotor layer.

In an embodiment, the adhesion promotor comprises a PEI, EAA or a derivative thereof.

In an embodiment, the coating A comprises at least one layer of an extruded polymeric film of PE (e.g. mLLDPE, LDPE, HDPE or their mixtures) and the adhesion promotor of the coating B comprises a PEI.

In an embodiment, the cellulosic fiber-based substrate is a recycled or virgin liner, medium, fine paper, newspaper, chipboard, Kraftpak® paper, paperboard, molded pulp, bleached paper board or any other cellulosic fiber-based substrate, wherein the cellulosic fiber-based substrate is optionally coated (e.g. clay coated). In an embodiment, the cellulosic fiber-based substrate has a basis weight from about 40 g/m$^2$ to about 1000 g/m$^2$. The cellulosic fiber-based substrate may preferably have a basis weight from about 200 g/m$^2$ to about 400 g/m$^2$.

In an embodiment, the polymeric film is applied in a quantity from about 2.5 g/m$^2$ to about 250 g/m$^2$. The polymeric film may be applied in a quantity from about 5 g/m$^2$ to about 30 g/m$^2$.

In an embodiment, the aqueous dispersion of the coating B is applied to the second surface of the cellulosic fiber-based substrate to reach a quantity of dried coating of at most about 20 g/m$^2$. The aqueous dispersion of the coating B may be applied to the second surface of the cellulosic fiber-based substrate to reach a quantity of dried coating of at most about 10 g/m$^2$.

According to a further aspect, there is provided a container made from the coated paper-based substrate as defined herein.

According to another aspect, there is provided the use of the container as described herein, for holding cold and/or frozen goods or goods that need to be refrigerated and/or frozen. The goods may include foodstuff.

Other objects, advantages and features of the present invention will become more apparent upon reading of the following non-restrictive description of embodiments thereof, with reference to the accompanying drawings.

DETAILED DESCRIPTION

Figure 1A:
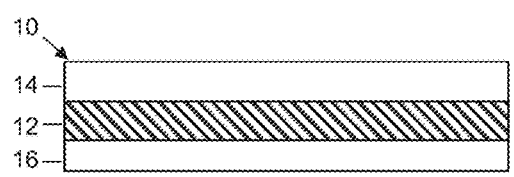
FIG. 1 comprises FIG. 1A to FIG. 1J which are cross-sectional views of a coated paper-based substrate according to various embodiments.

A paper-based substrate coated for manufacturing a container to hold goods will be described.

Broadly described, the coated paper-based substrate comprises a cellulosic fiber-based substrate coated on a first surface with a coating A and coated on a second surface with a coating B. The coating A comprises at least one layer of an extruded or laminated polymeric film or of a laminated foil. The coating B comprises at least one layer obtained by applying an aqueous dispersion of at least one polymer or copolymer. The extruded or laminated polymeric film and the polymer or copolymer of the aqueous dispersion are different. The coatings A and B are heat sealable to each other.

As will be described in more detail below, in one embodiment, the coating A may further comprise a primer layer between the first surface of the cellulosic fiber-based substrate and the layer of the extruded or laminated polymeric film or the laminated foil.

In another embodiment, the coating B may also comprise an adhesion promotor to enhance heat sealing between the coatings A and B.

In another embodiment, the coating A faces goods in the container, in use, and thereby forms an interior coating, the coating B forming an exterior coating.

A process for manufacturing a coated paper-based substrate as described herein may comprise the following steps:
  applying the aqueous dispersion of at least one polymer or copolymer to the second surface of the paper-based substrate;
  drying the aqueous dispersion to form a layer of the polymer or copolymer on the second surface of the paper-based substrate; and
  applying by extrusion or lamination the layer of the polymeric film or laminating the foil on the first surface of the paper-based substrate.

In an embodiment, the process may further comprise applying a primer layer on the first surface of the paper-based substrate before applying the layer of the polymeric film or laminating the foil.

Abbreviations and Definitions

Various terms and abbreviations used in the present description will be defined in the following paragraphs.

PE: polyethylene, polymer resulting from the polymerization of ethylene and having the chemical formula $(C_2H_4)_n$. PE includes any type of polyethylene such as LDPE, MDPE, HDPE, LLDPE and any other type of polyethylene known in the field. In the present description, PE also refers to any mixture of the different types of polyethylene previously mentioned.

LDPE: low density polyethylene. LDPE may be defined by a density range from 0.910-0.925 g/cm3.

MDPE: medium density polyethylene. MDPE may be defined by a density range from 0.926 to 0.940 g/cm3.

HDPE: high density polyethylene. HDPE may be defined by a density range from 0.941 to 0.97 g/cm3.

LLDPE: linear low density polyethylene. LLDPE may show a density ranging from 0.91 to 0.94 g/cm3. An example of LLDPE is mLLDPE which is manufactured by using metallocene catalysts.

PP: polypropylene, polymer resulting from the polymerization of ethylene and having the chemical formula $(C_3H_6)_n$.

PET: polyethylene terephthalate, a polymer consisting of polymerized units of the monomer ethylene terephthalate having the chemical formula $[OC(O)C6H4C(O)OC2H4]n$.

PLA: polylactic acid, a polyester having the chemical formula $[CH(CH3)C(O)O]n$.

PBS: Polybutylene succinate, an aliphatic polyester consisting of polymerized units of butylene succinate having the chemical formula $[C(O)C_2H_4C(O)OC_4H_8O]_n$.

PVDC: polyvinylidene chloride, a homopolymer of vinylidene chloride having the chemical formula $(C_2H_2Cl_2)_n$.

PEI: polyethyleneimine, a linear or branched polymer consisting of polymerized unit of ethyleneimine. The linear form has the chemical formula (C2H5N)n.

EAA: ethylene-acrylic acid copolymer, a copolymer of ethylene and acrylic acid having the chemical formula (C5H8O2)n.

EMA: ethyl methacrylate having the chemical formula $(C_6H_{10}O_2)_n$.

EEA: ethylene-ethyl acrylate copolymer having the chemical formula $((CH_2CH_2)_x[CH_2CH(CO_2C_2H_5)]_y)$.

EvOH: ethylene vinyl alcohol, a copolymer of ethylene and vinyl alcohol having the chemical formula $(C_2H_4O)_x(C_2H_4)_y$.

PBAT: polybutyrate adipate terephthalate, copolyester of adipic acid, 1,4-butanediol and dimethyl terephthalate, having the formula $(C(O)C_6H_4C(O)OC_4H_8)_m(C(O)C_4H_8C(O)OC_4H_8O)_n$.

In the present description, a "container" means a receptacle for holding goods. A container can be a box, a cup, a bowl, a can, a jar, a carton, a tray, a plate, a bottle or any other suitable receptacle capable of holding goods.

In the present description, the "goods" to be packaged in the container can be any type of goods, including foodstuff, such as any solid, semi-solid or liquid foodstuff. For instance, the foodstuff can be water, juice, coffee, tea, soft drink, milk, soup, ice cream, ice, meals, meat, fish, vegetables, fruits, pastry, etc. However, the goods are not limited to foodstuff, and could include ice packs or gel bags for pain relief to name a few other possible non-foodstuff goods. In an embodiment, the goods may be refrigerated and/or frozen, or may be any goods having a temperature which is colder than the ambient temperature at which they are packaged/poured in the container.

When the goods to be packaged in the container are foodstuff, the container can include, without being limited to, a cup for any type of drinks (e.g. coffee; soft drinks), a milk box, a container for ice cream, a bowl for soup, a dinner box etc.

In the present description, the "cellulosic fiber-based substrate" is used as the basis substrate onto which different coatings are applied, as will be described in detail below, to make the coated paper-based substrate. For example, the cellulosic fiber-based substrate can be a recycled or virgin liner, medium, fine paper, newspaper, chipboard, Kraftpak® paper, paperboard, molded pulp, bleached paper board (e.g. solid bleached sulphate (SBS)) or any other cellulosic fiber-based substrate. The cellulosic fiber-based substrate used to make the paper-based substrate described herein, can be uncoated or coated, i.e. with a clay coating.

The term "about", as used herein before any numerical value, means within an acceptable error range for the particular value as determined by one of ordinary skill in the art. This error range may depend in part on how the value is measured or determined, i.e. the limitations of the measurement system. It is commonly accepted that a 10% precision measure is acceptable and encompasses the term "about".

Coated Paper-Based Substrate

Referring to FIG. 1, the coated paper-based substrate (10) comprises a cellulosic fiber-based substrate (12) having a first and a second surface. The first surface is coated with coating A and the second surface is coated with coating B.

In particular embodiment, the coating A may face goods in the container in use and may be referred to as the "interior" coating. The coating B may then be directed toward the exterior of container in use and may be referred to as the "exterior" coating. However, the coating A may also face the exterior of the container in use, the coating B then facing the interior.

According to an embodiment, as shown in FIG. 1A, the coating A may comprise at least one layer of a polymeric film which is extruded or laminated or of a laminated foil (14) and the coating B may comprise at least one layer of an aqueous dispersion of at least one polymer or copolymer (16). In an embodiment, the layer (16) may provide a water and/or moisture barrier to the second surface of the paper-based substrate once coated.

Figure 1B:
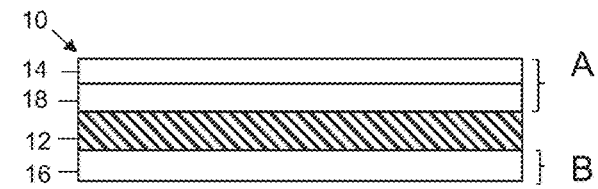

According to another embodiment, as shown in FIG. 1B, the coating A may further comprise a primer layer (18) applied between the first surface of the cellulosic fiber-based substrate (12) and the layer of the extruded or laminated polymeric film or the laminated foil (14). In this configuration, the coating A may comprise at least two coated layers.

Figure 1C:
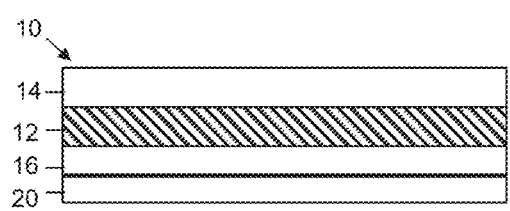

According to another embodiment, the coating B may also comprise an adhesion promotor to enhance heat sealing between the coating B and the coating A. The adhesion promotor may be present in the aqueous dispersion of the polymer or copolymer forming layer (16) or may be applied as an additional layer onto the extruded or laminated polymeric film or the laminated foil. In the latest case, the coated paper-based substrate (10) would have a configuration as shown in FIG. 1C, wherein the adhesion promotor is represented by layer (20) covering layer (16) of the aqueous dispersion of the polymer or copolymer.

Figure 1D:
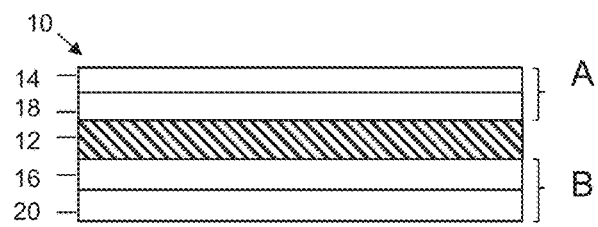

According to a further embodiment, the coated paper-based substrate (10) may present a coating layout corresponding to the one shown in FIG. 1D, wherein the basis substrate (12) comprises a coating A composed of a primer layer (18) and a layer of an extruded or laminated polymeric film or laminated foil (14), and a coating B composed of at least a layer of an aqueous dispersion of a polymer or copolymer (16) and an adhesion promotor layer (20).

Figure 1E:
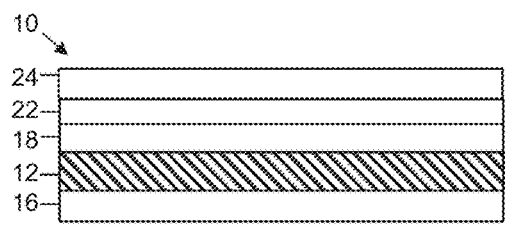

According to a further embodiment, the coated paper-based substrate (10) may present a coating layout corresponding to the one shown in FIG. 1E, wherein the basis substrate (12) comprises a coating A composed of a primer layer (18), a metallized side of a metallized film (22) and a polymeric side (e.g. PET) of a metallized polymeric film (24), and a coating B composed of at least a layer of an aqueous dispersion of a polymer or copolymer (16).

Figure 1F:
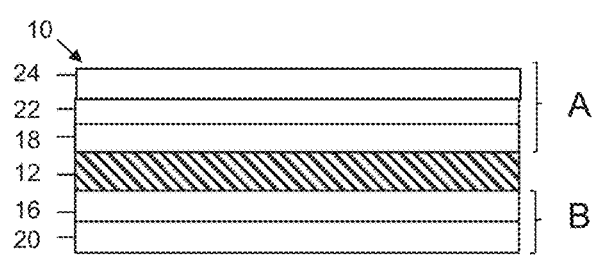

According to a further embodiment, the coated paper-based substrate (10) may present a coating layout corresponding to the one shown in FIG. 1F, wherein the basis substrate (12) comprises a coating A composed of a primer layer (18) a metallized side of a metallized film (22) a polymeric side (e.g. PET) of a metallized polymeric film (24), and a coating B composed of at least a layer of an aqueous dispersion of a polymer or copolymer (16) and an adhesion promotor layer (20).

Figure 1G:
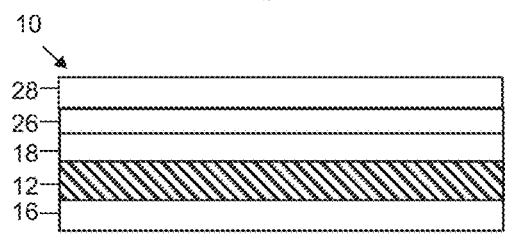

According to a further embodiment, the coated paper-based substrate (10) may present a coating layout corresponding to the one shown in FIG. 1G, wherein the basis substrate (12) comprises a coating A composed of a primer layer (18), a layer of an extruded or laminated polymeric film (e.g. LDPE) (26) and a layer of laminated foil (28), and a coating B composed of at least a layer of an aqueous dispersion of a polymer or copolymer (16).

Figure 1H:
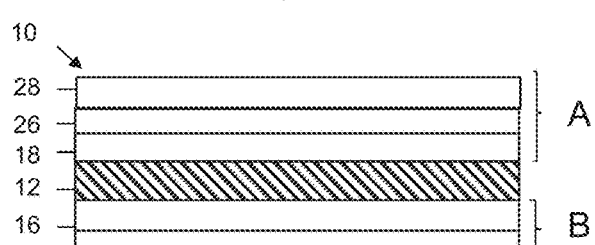

According to a further embodiment, the coated paper-based substrate (10) may present a coating layout corresponding to the one shown in FIG. 1H, wherein the basis substrate (12) comprises a coating A composed of a primer layer (18), a layer of an extruded or laminated polymeric film (e.g. LDPE) (26) and a layer of laminated foil (28), and a coating B composed of at least a layer of an aqueous dispersion of a polymer or copolymer (16) and an adhesion promotor layer (20).

Figure 1I:
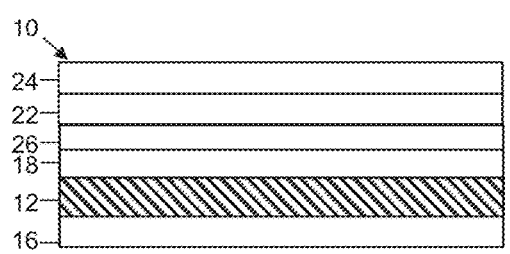

According to a further embodiment, the coated paper-based substrate (10) may present a coating layout corresponding to the one shown in FIG. 1I, wherein the basis substrate (12) comprises a coating A composed of a primer layer (18), a layer of an extruded or laminated polymeric film (e.g. LDPE) (26), a metallized side of a metallized film (22) and a polymeric side (e.g. PET) of a metallized polymeric film (24), and a coating B composed of at least a layer of an aqueous dispersion of a polymer or copolymer (16).

Figure 1J:
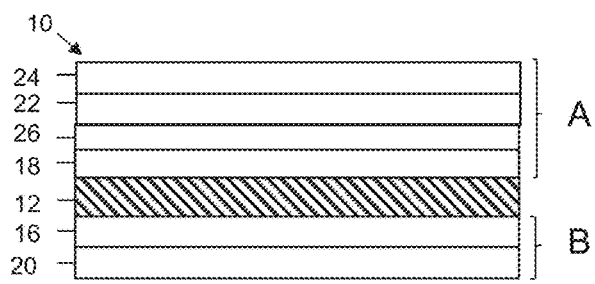

According to a further embodiment, the coated paper-based substrate (10) may present a coating layout corresponding to the one shown in FIG. 1J, wherein the basis substrate (12) comprises a coating A composed of a primer layer (18), a layer of an extruded or laminated polymeric film (e.g. LDPE) (26), a metallized side of a metallized film (22) and a polymeric side (e.g. PET) of a metallized polymeric film (24), and a coating B composed of at least a layer of an aqueous dispersion of a polymer or copolymer (16) and an adhesion promotor layer (20).

The cellulosic fiber-based substrate (12) may be any type of substrate usually used in the field and can be a recycled or virgin liner, medium, fine paper, newspaper, chipboard, Kraftpak® paper, paperboard, molded pulp, bleached paper board (e.g. SBS) or any other cellulosic fiber-based substrate. The cellulosic fiber-based substrate (12) used to make the coated paper-based substrate (10) can be a basis substrate which has previously been coated, i.e. with a clay coating, as commonly used in the field.

Examples of cellulosic fiber-based substrate (12) can have a basis weight from about 40 g/m² to about 1000 g/m². In an optional embodiment, the cellulosic fiber-based substrate (12) can have a basis weight from about 200 g/m² to about 400 g/m².

As previously mentioned, the coating A and the coating B should be heat-sealable to each other. While it is usually observed that coatings of the same nature are heat-sealable to each other, such as for two extruded polyethylene coatings, heat-sealing two coatings of different nature, such as an extruded or laminated polymeric film coating on one hand and an aqueous based coating on the other hand may however not be straightforward. According to one embodiment, heat sealing coatings of different nature may be achieved when the surface tension of coating B is close or fairly close to a value of the surface tension of coating A.

According to another embodiment, heat sealing coatings of different nature may be achieved by the addition of mineral charges such as calcium carbonate (CaCO3), clay, mica, talc, titanium dioxide and/or carbon black. The addition of mineral charges contributes to the surface roughness or the deviation of a sample surface from a plane. The roughness of the surface of a sample significantly influence the coating adhesion by providing points of attachment or adhesion points for the coatings.

According to another embodiment, the coating's grammage or mass per unit area also influence the adhesion. Instinctively, a higher grammage would improve the heat sealing of the coatings. Accordingly, the quantity of coating B would have impact on the water absorptiveness and grease resistance. However, in practice a higher grammage may have a contribution to the surface porosity and again a decrease in relative roughness of the surface impairs the heat-sealing aptitude of the coatings. It may be understood that a higher porosity provides an improved contact surface and again provides points of attachment or adhesion points for the coatings.

The coating A and the coating B will now be described in more detail.

Coating A

As previously described, the coating A of the coated paper-based substrate comprises at least one layer of a polymeric film or of a laminated foil (14). The polymeric film depending on its nature is applied by extrusion or laminated onto the substrate. In an embodiment, the polymeric film or the laminated foil may provide an oil and/or grease and/or moisture and/or water barrier to the paper-based substrate once coated.

In one embodiment, the coating A may comprise a polymeric film which is a PE, PLA, PBS, PP, PET, EvOH, Nylon, PVDC or a metallized film, or may comprise a foil. The PE may be a mLLDPE, LDPE, HDPE or any mixture thereof. The metallized film is understood to comprise any polymer film coated with a thin layer of metal (e.g. aluminium). Examples of films used in metallized film include PLA, PBS, PE, PET, PP and nylons. In some embodiment, bio-based polymers which are manufactured from renewable resources may be used in the polymeric film of coating A. Hence, the polymeric film may be obtained from Bio-PE, Bio-PBS, Bio-PP or Bio-PET.

When the polymeric film of coating A comprises PE, PLA, PBS, PP, EvOH or PVDC, it is applied by extrusion onto the substrate's surface. When the polymeric film is PET, Nylon or a metallized film, lamination is employed for applying such films to the substrate's surface. Foil is also applied by lamination. In a particular embodiment, where the coating A comprises a laminated polymeric film or foil, a PE film may be laminated on the substrate's surface before lamination of the polymeric film or foil.

In a particular embodiment, the coating A may comprise an extruded polymeric film made from PE (mLLDPE, LDPE, HDPE or their mixtures), PBS or PLA. It is worth mentioning that the polymeric film may result from extrusion of one, two or three layers of PE, PBS or PLA. For each layer, the nature of the PE, PBS or PLA may be the same or different. Considering for example that the polymeric film of coating A comprises PLA (the same would apply for PE or PBS): the film may consist of one extruded layer of PLA, two extruded layers of PLA or three extruded layers of PLA, each layer being of the same PLA or of different PLAs. In one embodiment, the polymeric film of coating A may comprise three extruded layers of PLA (or PE or PBS) wherein either the same PLA (or PE or PBS) is used for the three layers, or wherein two different types of PLA (or PE or PBS) are used. In the case where two different types of PLA are used, let's say PLA1 and PLA2, the following combinations of extrusion layers would be possible: (PLA1)(PLA1)(PLA2) or (PLA1)(PLA2)(PLA1) or (PLA2)(PLA1)(PLA1) or (PLA1)(PLA2)(PLA2) or (PLA2)(PLA1)(PLA2) or (PLA2)(PLA2)(PLA1). These possible combinations would also apply for two different PE or two different PBS.

Optionally, the polymeric film may further comprise mineral charges (e.g. calcium carbonate, clay, mica, talc, titanium dioxide and/or carbon black) and other additives such as Ethyl Methacrylate (EMA), Ethylene Ethyl Acrylate (EEA) or Ethylene Acrylic Acid (EAA) for instance. When the polymeric film comprises PLA, it may also further comprise polybutyrate adipate terephthalate (PBAT).

Examples of commercial products which may be used to form the polymeric film of the coating A may be the products Ecovio® (BASF) which comprises a PLA and PBAT, BioPBS™ FZ91, FZ71 or FD92 (PTT MCC Biochem) which comprise PBS, MarFlex® 1017 (Chevron Phillips) which comprise a LDPE or DOW™ Polyethylene 722 (Dow Plastics) which comprises LDPE to name a few. PLA's resin products manufactured by DaniMer Scientific LLC or NatureWorks LLC may also be used to form the polymeric film layer of the coating A. The products Ecovio®, which comprise PLA, are compostable polymers. This makes them attractive on an environmental perspective. This is also the case for the PBS products BioPBS™ FZ91, FZ71 or FD92, which are bio-based material made from renewable resources. As previously mentioned, the coating A may comprise a layer of a laminated foil instead of the polymeric film described above. The laminated foil may be any type of metallic foil, for example an aluminium foil.

According to a further embodiment, the coating A of the coated paper-based substrate may comprise a primer layer (18) between the first surface of the cellulosic fiber-based substrate (12) and the layer of the extruded or laminated polymeric film or the laminated foil (14). It may be advantageous in some embodiments to have a primer in between the substrate surface and the polymeric film or laminated foil, to enhance adhesion and/or reduce coating weight and costs.

The primer layer is usually obtained by application of a water based emulsion or dispersion of polymers or copolymers onto the first surface of the cellulosic fiber-based substrate. In an embodiment, the water based emulsion or dispersion may comprise polymers or copolymers which are selected from acrylic-based polymers, acrylate-based polymers, styrene-butadiene copolymers, styrene-acrylic copolymers, styrene-acrylic-acrylonitrile copolymers, polyethylene imines, functionalized polypropylenes, polyurethanes, polyesters, ethylene-acrylic acid copolymers, modified ethylene copolymers and any mixture thereof.

Table 1 below provides examples of primer layers that may be used underneath the polymeric film or laminated foil in the coating A.

TABLE 1

| Polymeric film/ laminated foil | Coating | |
|---|---|---|
| | Primer layer (water based emulsion, dispersion or solution) | |
| PE (e.g. LDPE, HDPE, mLLDPE and their mixtures) | PEI | Examples: Adcote ® 313 Michem ® Flex P1852 MICA A-131-X Aquacer ® 1061 |
| PLA | Styrene-butadiene copolymer, styrene-acrylic copolymer, styrene-acrylic-acrylonitrile copolymer, polyester- polyurethane elastomer | Examples: MICA R-1509-B Michem ® Flex P1822 Acronal ® S 504 NA Styronal ® BN 4606 Epotal ® P100 ECO Epotal ® S440 |
| PBS | Styrene-acrylic copolymer, styrene-acrylic-acrylonitrile copolymer, styrene-butadiene copolymer | Examples: MICA R-1509-B Acronal ® S 504 NA Styronal ® BN |
| PP | Functionalized polypropylene resin emulsion | Examples: MICA R-3332-A MICA R-1207 |
| PET | Polyurethane, EAA | Examples: MICA I-372-C MICA G-1092 |
| Nylon | EEA | MICA G-1092 |
| PVDC | Polyester-polyurethane elastomer | Example: Luphen ® 700 BASF |
| Metallized film | Water based modified ethylene copolymer resin dispersion, EEA | Examples: MICA M-1164 MICA G-1092 |
| Laminated foil | EEA | Example: MICA G-1092 |

In a particular embodiment, the primer layer may comprise a water based emulsion or dispersion of a styrene-butadiene copolymer, styrene-acrylic copolymer, styrene-acrylic-acrylonitrile copolymer or polyester-polyurethane elastomer. For instance, and more particularly when the polymeric film comprises PLA or PBS, the water based emulsion or dispersion of the primer layer may be selected from the product MICA R-1509-B, Michem® Flex P1822, Acronal® S 504 NA, Styronal® BN 4606 or Epotal® P100 ECO.

In another embodiment, the coating A may comprise a primer layer of a water based emulsion or dispersion of a styrene-butadiene copolymer, styrene-acrylic copolymer, styrene-acrylic-acrylonitrile copolymer or polyester-polyurethane elastomer (e.g. MICA R-1509-B, Michem® Flex P1822, Acronal® S 504 NA, Styronal® BN 4606 or Epotal® P100 ECO) underneath a layer of an extruded film of PLA.

In a further embodiment, the coating A may comprise a primer layer of the product MICA R-1509-B and a layer of an extruded film of an Ecovio® product.

In another particular embodiment, the coating A may face the goods in the container erected from the coated substrate, thereby forming the interior coating. In addition, if the container to be erected from the coated paper-based substrate is intended to be used for foodstuff packaging, the polymeric film of coating A may advantageously comprise a food grade polymer. The primer may comprise pigments, dyes, anti-foaming agents, dispersing agents, thickening agents, pH control agents, antioxidant agents, antimicrobial agents (SANAFOR® for example), or ethylene absorbers, such as carbon, alumina, clay and the like.

Coating B

The coating B of the coated paper-based substrate generally comprise at least one layer obtained by applying an aqueous dispersion of at least one polymer or copolymer. The coating layer B may comprise two layers obtained by applying two aqueous dispersions of at least one polymer or copolymer. The composition of the aqueous dispersions of the two layers may be the same or may be different. According to one embodiment, the polymer(s) or copolymer(s) may provide a water and/or moisture barrier to the second surface of the paper-based substrate once coated. According to a further embodiment, the polymer(s) or copolymer(s) of the coating B may provide oil and/or grease barrier to the paper-based substrate. The term "barrier" as used herein should not be solely limited as strictly preventing passage of water and/or moisture and/or oil and/or grease throughout the paper-based substrate. The polymers or copolymers in the coating B may be chosen to impart some water and/or moisture resistance and eventually oil and/or grease resistance to the paper-based substrate's surface. As such, the polymers or copolymers may be selected to limit or even avoid progression of water and/or moisture and eventually of oil and/or grease throughout the paper-based substrate.

In one embodiment, the aqueous dispersion of coating B may comprise a polymer or copolymer selected from an acrylic- or acrylate-based polymer or copolymer, polyester, plant oil-based polyester resin, polyurethane, polyvinylidene chloride (PVDC), paraffinic wax, styrene-butadiene copolymer, starch, dextrin, LDPE, HDPE, PLA, EAA, nylon, polypropylene emulsions and mixtures thereof. Examples of acrylic- or acrylate-based polymers or copolymers include styrene-acrylic copolymers and styrene-acrylic-acrylonitrile copolymers. An example of polyester is a polyethylene terephthalate (PET).

In some embodiments, the aqueous dispersion may further comprise mineral charges, such as for example calcium carbonate ($CaCO_3$), clay, mica, talc, titanium dioxide and/or carbon black. The aqueous dispersion of the coating B may also comprise other additives such as pigments, dyes, anti-foaming agents, dispersing agents, thickening agents, pH control agents, antioxidant agents, antimicrobial agents, ethylene absorbers, etc.

Examples of commercial compounds which could be used for the aqueous dispersion for the coating B include the products Serfene™ 546 (DOW) which comprise polyvinylidene chloride (PVDC) copolymer, Actega® X22 (Altana) which comprise acrylate based products, Michem®Coat 81 (Michelman) which comprise styrene-butadiene copolymers and pigments, Vaporcoat 2200R (Michelman) which comprise styrene-acrylate and paraffin and hydrocarbon waxes, Barrier-Grip R5701A (IGI Enviro-Coatings) which comprise styrene acrylic and clay, Spectra-Guard™ 3003 (Spectra-Kote) which comprise acrylic based products, Spectra-Guard™ 3005 or 3007BK (Spectra-Kote) which comprise acrylic based products and emulsified waxes, HydraBan® products (Michelman) which comprise paraffin waxes, Aquaban® products (IGI) which comprise paraffin waxes, Aquacer® 1061 (BYK) which comprise an anionic aqueous emulsion of an ethylene acrylic acid (EAA) copolymer wax, MICA R-1509-B (Mica Corporation) which comprise acrylate based products, Styronal® 4606 (BASF) which comprise a styrene-acrylonitrile-acrylate copolymer, Acronal® S504 (BASF) which comprise acrylate styrene copolymers, X300AF (Michelman) which comprise styrene-butadiene copolymers and emulsified waxes, Michem®Coat 55 (Michelman) which comprise styrene-butadiene copolymers and pigments, and Epotal® S440 (BASF) which comprise styrene acrylic polymers etc.

In a particular embodiment, the aqueous dispersion used for the coating B may include MICA R-1509-B (Mica Corporation), Styronal® 4606 (BASF), Acronal® S504 (BASF), Epotal® 100 (BASF), Actega® X22 (Altana), Aquaban® products (IGI), and Barrier-Grip R5701A (IGI Enviro-Coatings).

In another embodiment, the aqueous dispersion of the coating B is identical to the aqueous dispersion of the primer layer of the coating A.

As previously mentioned, the coating B may, in some embodiments, further comprise an adhesion promotor, which will enhance heat sealing between the coatings A and B of the coated paper-based substrate. When an adhesion promotor is used, it may be added to the aqueous dispersion before application thereof to the basis substrate, or the adhesion promotor may be applied separately, as an additional layer, onto the polymer or copolymer layer resulting from application of the aqueous dispersion.

Examples of adhesion promotors include, without limitation, PEI, EMA, EEA, EAA or derivatives thereof, or any other known adhesion promoting agents. The adhesion promotor may also be LDPE. The adhesion promotors may be provided as water-based dispersions or waterborne solutions.

In some embodiments, the coating B may present a surface tension which varies from about 15 to about 60 dynes/cm. The surface tension of the coating B may be above about 38 dynes/cm in some applications, for instance if the surface is to be printed by flexography.

As mentioned above, the coating B is heat sealable to the coating A. In addition, the coating B may present the following optional features, which may be combined or not. It may be water and/or moisture resistant, oil and/or grease resistant, printable (e.g. flexo printable, offset printable, digital printable), coldset gluable, hotmelt gluable, anti-slip, anti-abrasive, tinted with different colors or pearlescent. The coating B may also present heat and/or cold insulation capabilities; it may be corrosion inhibitor, antistatic conductive/dissipative/resistive, cohesive, pressure sensitive, thermal indicator (color change upon ambient temperature).

Coating Combinations

As mentioned above, one important feature of the coating A and coating B applied onto the paper-substrate, is that they are heat sealable to each other. Indeed, when erecting the container using the coated paper-substrate, a portion of the coating B will be superimposed to a portion of the coating A, and the superimposed portions will be "glued" together using heat. A good adhesion between the two coatings, through heat-sealing, will maintain integrity of the container in use.

The features of each one of the coatings A and B have been described above. However, Table 2 below provides some examples of combinations of coatings A and B in the coated paper-based substrate. Table 2 also mentions whether an adhesion promotor may be used for the coating B in these example combinations.

TABLE 2

| Coating A<br>Polymeric film or laminated foil | Coating B<br>Polymer or copolymer in the aqueous dispersion |
| --- | --- |
| PE (LDPE, HDPE, mLLDPE, or their mixtures) | Acrylic or acrylate-based polymers and pigments<br>polyesters (e.g. PET)<br>polyurethanes<br>PVDC<br>LDPE emulsion<br>styrene-butadiene copolymer and pigments |
| PLA | Acrylic or acrylate-based polymers<br>styrene-butadiene copolymer<br>wax emulsions |
| PBS | Acrylic or acrylate-based polymers<br>styrene-butadiene copolymer<br>wax emulsions |
| PP | Acrylic or acrylate-based polymers and pigments<br>polyesters (e.g. PET)<br>styrene-butadiene copolymer and pigments<br>Polypropylene emulsion |
| PET | Acrylic or acrylate-based polymers<br>polyurethanes<br>PVDC<br>styrene-butadiene copolymer |
| Nylon | Acrylic or acrylate-based polymers<br>polyesters (e.g. PET)<br>polyurethanes<br>PVDC<br>styrene-butadiene copolymer |
| PVDC | Acrylic or acrylate-based polymers<br>polyesters (e.g. PET)<br>polyurethanes<br>styrene-butadiene copolymer |
| metallized film | Acrylic or acrylate-based polymers<br>polyesters (e.g. PET)<br>polyurethanes<br>PVDC<br>styrene-butadiene copolymer |
| Aluminum foil | Acrylic or acrylate-based polymers<br>polyesters (e.g. PET)<br>polyurethanes<br>PVDC<br>styrene-butadiene copolymer<br>Ethylene emulsion |

In some embodiments, the coating B may comprise an adhesion promoter for promoting heat sealing between the coatings A and B of the coated paper-based substrate. Examples of adhesion promotors include, without limitation, PEI, EMA, EEA, EAA, pigments or derivatives thereof, or any other known adhesion promoting agents. The adhesion promotor may also comprise LDPE or wax emulsion. The adhesion promotor may be added to the aqueous dispersion or applied separately. The adhesion promotor may be selected according to its compatibility with the polymer(s) or copolymer(s) of the aqueous dispersion and in various concentrations, as the person skilled in the art would be able to determine.

In some particular embodiments, the coated paper-based substrate may comprise the combinations of coatings A and B as mentioned in Table 3.

TABLE 3

| Coating A | | Coating B | |
| --- | --- | --- | --- |
| Extruded or laminated polymeric film | Primer | Polymer or copolymer in the aqueous dispersion | Adhesion promoter |
| PE (LDPE, HDPE, mLLDPE, or their mixtures<br>Examples:<br>MarFlex ® 1017<br>DOW ™ Polyethylene 722 | PEI,<br>Examples:<br>Adcote ® 313,<br>Loxanol ® MI 6730<br>Michem ® Flex P1852,<br>MICA A-131-X<br>Aquacer 1061 | LDPE, mLLDPE,<br>HDPE emulsion.<br>Polyethylene oxide emulsion, cationic latex<br>Examples:<br>Michem ®Coat 81<br>IGI Barrier Grip R5701A Michelman X300 | BYK Aquacer 061<br>Aquaban series<br>Hydraban 708<br>PEI<br>Pigments (such as claim, CaCo$_3$, talc)<br>Examples:<br>Adcote ® 313,<br>Michem ® Flex P1852,<br>MICA A-131-X |
| PLA<br>Examples:<br>Ecovio ® products | Styrene-butadiene copolymer, styrene-acrylic copolymer, styrene-acrylic-acrylonitrile polyester-elastomer with or without blends with inorganic compounds with or without wax emulsion<br>Examples:<br>MICA R-1509-B,<br>Michem ® Flex P1822,<br>Acronal ® S 504 NA,<br>Styronal ® BN 4606 or Epotal ® P100 ECO | Styrene-acrylic copolymer, styrene-acrylic-acrylonitrile copolymer, styrene-butadiene copolymer, with or without blends with inorganic compounds with or without wax emulsion<br>Examples:<br>Spectra-Guard 3000<br>Spectra-Guard 3003<br>IGI Barrier Grip R5701A<br>Spectra-Guard 3005<br>Michem ®Coat 81<br>Michem ®Coat 55<br>Actega X22<br>Epotal S440<br>MICA R-1509-B<br>Acronal ® S 504 NA | Styrene-acrylic copolymer, styrene-acrylic-acrylonitrile copolymer, styrene-butadiene copolymer, with or without blends with inorganic compounds with or without wax emulsion<br>Examples:<br>MICA R-1509-B<br>Acronal ® S 504 NA<br>Epotal ® S440 |

TABLE 3-continued

| | Coating A | | Coating B | |
|---|---|---|---|---|
| Extruded or laminated polymeric film | Primer | Polymer or copolymer in the aqueous dispersion | Adhesion promoter | |
| PBS Examples: BioPBS ™ FZ71 or FD92 | Styrene-acrylic copolymer, styrene-acrylic-acrylonitrile copolymer, styrene-butadiene copolymer, polyester-elastomer with or without blends with inorganic compounds with or without wax emulsion Examples: MICA R-1509-B Acronal ® S 504 NA Styronal ® BN 4606 | Styrene-acrylic copolymer, styrene-acrylic-acrylonitrile copolymer, styrene-butadiene copolymer with or without blends with inorganic compounds with or without wax emulsion Examples: Spectra-Guard 3000 Spectra-Guard 3003 IGI Barrier Grip 5701A Michem ®Coat 81 Michem ®Coat 55 Actega X22 Epotal S440 MICA R-1509-B Acronal ® S 504 NA | Styrene-acrylic copolymer, styrene-acrylic-acrylonitrile copolymer, styrene-butadiene copolymer with or without blends with inorganic compounds with or without wax emulsion MICA R-1509-B Acronal ® S 504 NA Epotal ® S440 | |
| PET Examples: EvCote ® Barrier 3000 or 3050 | Polyurethane, polyethylene acrylic acid (EAA), ethylene copolymer resin dispersion Examples: MICA I-372-C MICA G- | PET emulsions, Polyurethane emulsions Examples: EvCote ® Barrier 3000or 3050 | Polyurethane, polyethylene acrylic acid (EAA), copolymer resin dispersion Examples: MICA I-372-C MICA G- | |

The coating combinations reported in Tables 2 and 3 are provided as examples only, and a person skilled in the art would be able to prepare a coated substrate with any other possible coatings, having the features as described herein.

Process

Various embodiments of a process for obtaining the coated paper-based substrate described herein will now be described.

Figure 2:
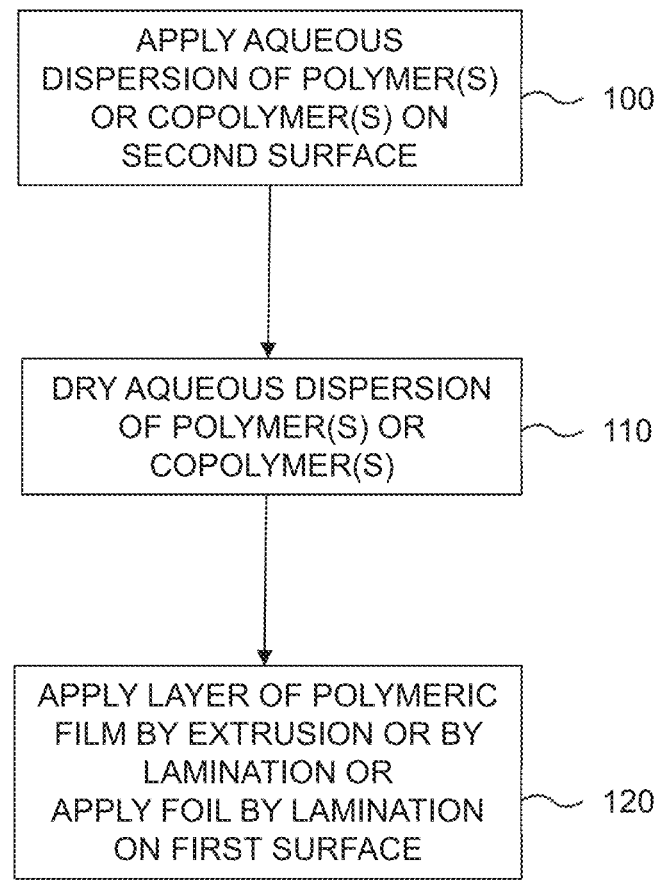
FIGS. 2 to 5 are block diagrams representing various embodiments of the process for obtaining a coated paper-based substrate.

FIG. 2 illustrates a first embodiment of the process for coating the cellulosic fiber-based substrate with the coating A and the coating B. More particularly, the embodiment shown in FIG. 2 would allow preparing the coated substrate illustrated in FIG. 1A. Hence, in this first embodiment, the process may comprise a first step (100) of applying the aqueous dispersion of the polymer(s) or copolymer(s) to the second surface of the paper-substrate, followed by step (110) of drying the aqueous dispersion, thereby forming layer (16) of the coating B. In step (120), the layer of the polymeric film or laminated foil is applied on the first surface of the paper-based substrate, thereby forming layer (14) of the coating A. The polymeric film, depending on its nature, may be applied by extrusion or by lamination. While most of the polymeric films used for the coating A will usually be applied by extrusion in an extruder, there are polymeric films such as nylon, PET or metallized films, which may however be applied by lamination.

When the polymeric film of coating A comprises PE, PLA, PBS, PP, EvOH or PVDC, it is applied by extrusion onto the substrate's surface. When the polymeric film is PET, Nylon or a metallized film, lamination is employed for applying such films to the substrate's surface. Foil is also applied by lamination. In a particular embodiment, where the coating A comprises a laminated polymeric film or foil, a PE film may be laminated on the substrate's surface before lamination of the polymeric film or foil.

In a particular embodiment, the coating A comprises PE (mLLDPE, LDPE, HDPE or their mixtures), PBS or PLA and is applied by extrusion on the substrate's surface. It is worth mentioning that the polymeric film may be applied by extrusion in one, two or three layers of PE, PBS or PLA. For each layer, the nature of the PE, PBS or PLA may be the same or different. For example, when PLA is used for the coating A (the same would apply for PE or PBS), one extruded layer of PLA, two extruded layers of PLA or three extruded layers of PLA, each layer being of the same PLA or of different PLAs, may be applied to the substrate's surface. In one embodiment, three extruded layers of PLA (or PE or PBS) are applied for the polymeric film of coating A. The three extruded layers may comprise either the same PLA (or PE or PBS), or two different types of PLA (or PE or PBS). In the case where two different types of PLA are applied, let's say PLA1 and PLA2, the PLA layers may be extruded according to one of the following combinations: (PLA1)(PLA1)(PLA2) or (PLA1)(PLA2)(PLA1) or (PLA2)(PLA1)(PLA1) or (PLA1)(PLA2)(PLA2) or (PLA2)(PLA1)(PLA2) or (PLA2)(PLA2)(PLA1). These possible combinations would also apply for two different PE or two different PBS.

Figure 3:
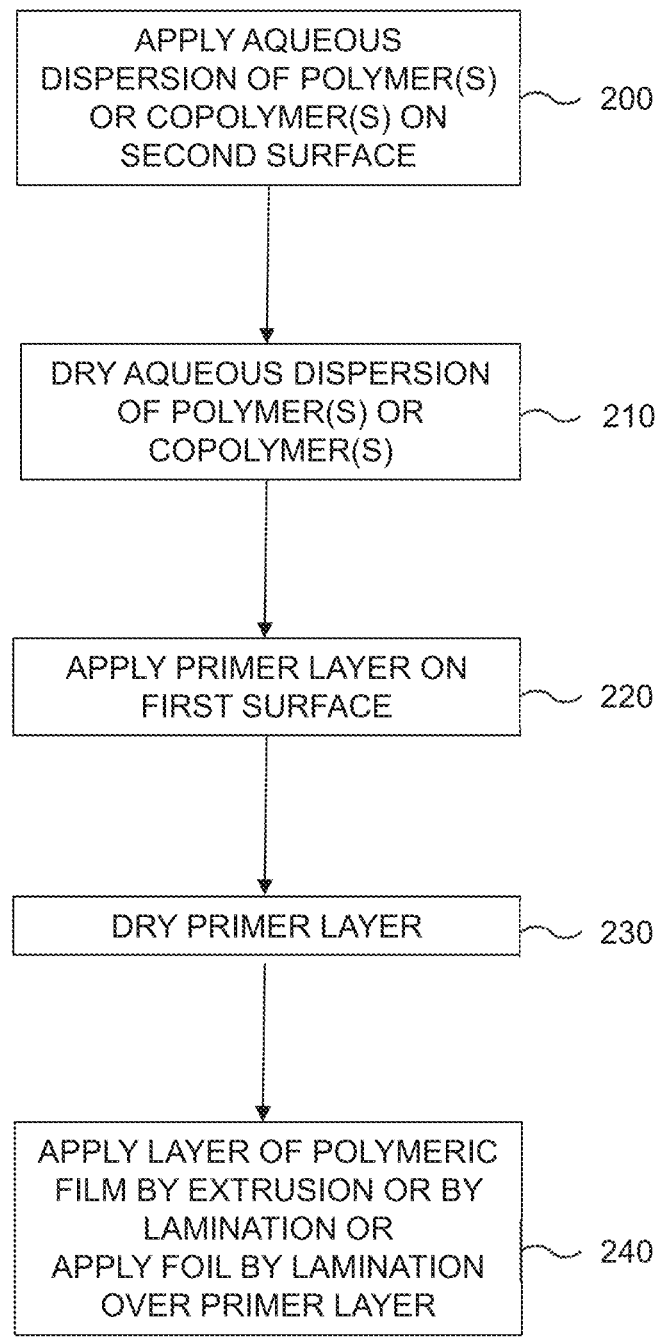
Figure 4:
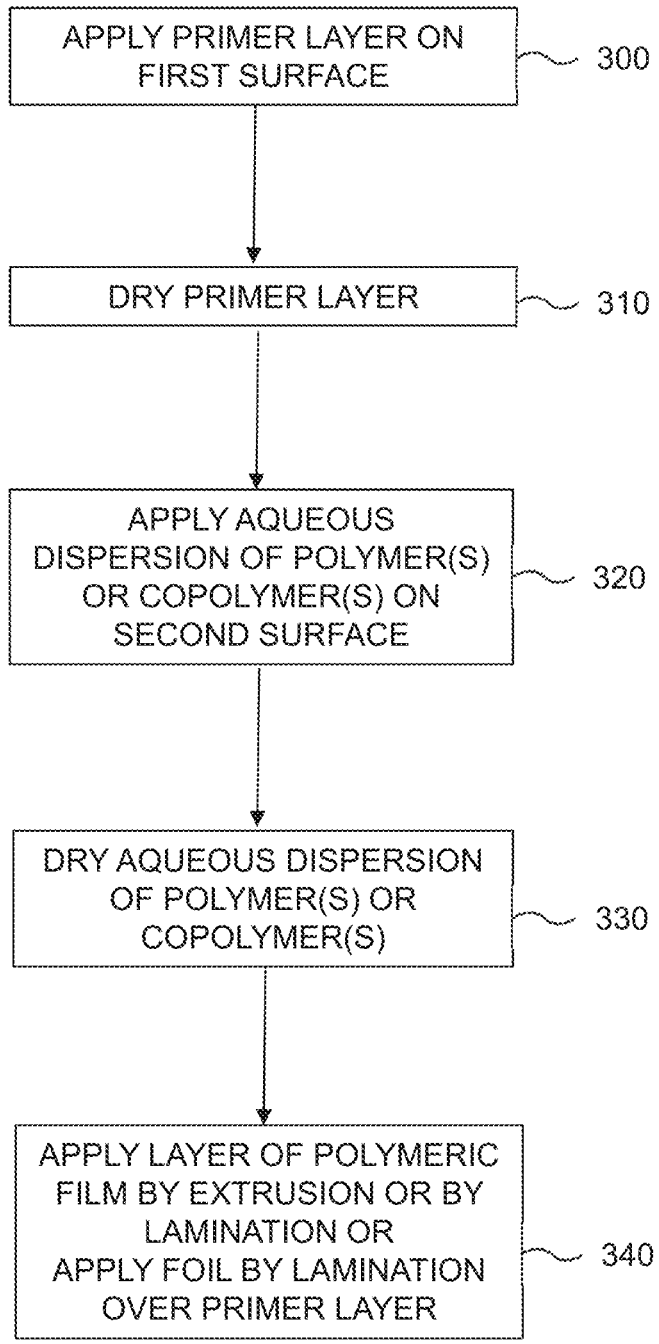
Figure 5:
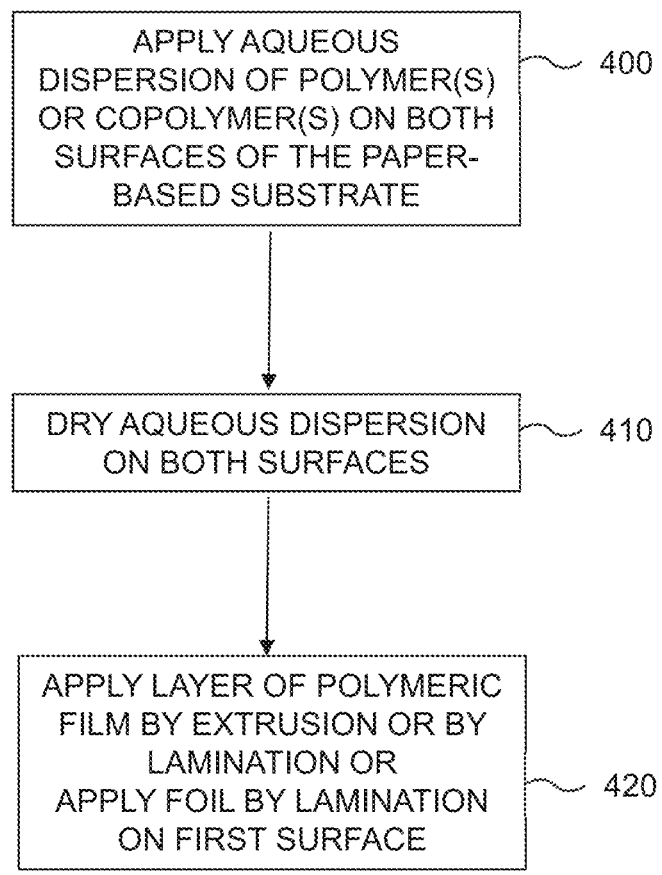

FIGS. 3 to 5 illustrate further embodiments of the process for coating the cellulosic fiber-based substrate with the coating A and the coating B. More particularly, the embodiments shown in FIGS. 3 to 5 would allow preparing the coated substrate illustrated in FIG. 1B.

In FIG. 3, the first step (200) comprises forming layer (16) of the coating B by application of the aqueous dispersion of the polymer(s) or copolymer(s) to the second surface of the paper-substrate, followed by step (210) of drying the aqueous dispersion. Steps (220) to (240) illustrate application of coating A. In step (220) the primer layer (18) of a water based emulsion, dispersion or solution of polymer(s) or copolymer(s) is applied on the first surface of the paper-based substrate. Then, the primer layer (18) is dried in step (230). The next step (240) comprises applying layer (14) of the polymeric film or laminated foil onto the primer layer (18). It is worth reminding that the aqueous dispersion applied to the second surface for forming coating B can be the same aqueous dispersion as the one used to form the primer layer of the coating A.

In FIG. 4, the primer layer (18) of the coating A is applied on the first surface of the substrate in step (300), and then dried in step (310). The layer (16) of the coating B is then formed by application of the aqueous dispersion of the polymer(s) or copolymer(s) to the second surface of the paper-substrate in step (320), followed by step (330) of drying the aqueous dispersion. The next step (340) comprises applying layer (14) of the polymeric film or laminated foil onto the primer layer (18).

In the embodiments represented in FIGS. 3 and 4, the aqueous dispersion of the coating B and the primer layer of the coating A are applied and dried in series, before application of the polymeric extrusion layer (or laminated layer) onto the primer layer. The embodiments of the process represented in FIGS. 3 and 4 can be more particularly used when the aqueous dispersions of the coating B and of the primer layer are different, but they could be also used if the aqueous dispersions are the same. However, when the aqueous dispersions of the coating B and of the primer layer are the same, it may be advantageous to apply these dispersions simultaneously on both surfaces of the paper-substrate, as shown in FIG. 5. In FIG. 5, step (400) thus comprises applying the aqueous dispersion of polymer(s) or copolymer(s) on both the first and second surface simultaneously. Then, in step (410) the aqueous dispersion is dried on both surfaces. Hence, the primer layer (18) of the coating A and the layer (16) of the coating B can be formed simultaneously. In the last step (420), the polymeric extrusion layer (or laminated layer) is applied onto one of the surfaces of the paper-substrate coated with the aqueous dispersion.

Even though FIGS. 2 to 5 do not expressly show a step of applying an adhesion promotor layer (20) onto the layer (16) obtained by application of the aqueous dispersion of polymer(s) or copolymer(s) onto the second surface, it is apparent to a person skilled in the art that such step, if required, could be carried out between steps 110 and 120 of FIG. 2, between steps 210 and 220 of FIG. 3, between steps 330 and 340 of FIG. 4 or between steps 410 and 420 of FIG. 5. Generally, if an adhesion promotor is present as a separate layer onto the layer (16) of the coating B, it is applied as a water-based dispersion or waterborne solution and then is dried before application of the polymeric extrusion layer or laminated layer on the opposite surface.

Application of the aqueous dispersions/emulsions/solutions, used for the coating B, the primer layer of the coating A, and the adhesion promotor layer if present, may be carried out using any known apparatus known in the art. For example, the aqueous dispersions/emulsions/solutions can be applied using a rod coater, Invo-coater, a blade coater, an air knife coater, a spray coater, a curtain coater, a slot die coater, an iso-bar rod coater, a gravure coater, a reverse gravure coater, roll coater or by flexography.

In an embodiment, the coating B comprises two layers obtained by applying two aqueous dispersions, comprising polymer(s) or copolymer(s) capable of providing a water and/or moisture barrier to the second surface of the paper-based substrate once coated. The composition of the aqueous dispersions of the two layers may be the same or may be different. In an embodiment, two successive applications are carried out to form the two layers of aqueous dispersion.

In a specific embodiment, a rod coater or a blade coater are used for applying the aqueous dispersions/emulsions/solutions. When the substrate is coated on both surfaces with an aqueous dispersion, which may be the same or different, to form the primer layer (18) and layer (16), two rod/blade coaters in series may be used, with a dryer placed between the first and second coaters to dry the first applied aqueous dispersion before application of the second one. Of course, a drier is also present after the second coater to dry the second applied aqueous dispersion.

Where the same aqueous dispersion is applied on both surfaces of the substrate, one could use coaters in series as explained above, or one could use a single coater capable of applying the aqueous dispersion at the same time on both surfaces of the substrate (see FIG. 5). For instance, the aqueous dispersion could be applied using a twin sizer, twin rod coater or twin blade coater.

The aqueous dispersion of the coating B, and the primer of the coating A when applied to the first surface, can be applied to the cellulosic fiber-based substrate to reach a quantity of dried coating of at most about 20 g/m$^2$. In an embodiment, the aqueous dispersion and/or the primer layer are applied to the cellulosic fiber-based substrate to reach a quantity of dried coating of at most about 10 g/m$^2$.

When the aqueous dispersion of the coating B comprises a PE, it may be applied to the second surface of the cellulosic fiber-based substrate to reach a quantity of dried coating from about 0.01 g/m$^2$, from about 0.05 g/m$^2$ or about 7 g/m$^2$. When the aqueous dispersion of the coating B comprises a PLA, it may be applied to the second surface of the cellulosic fiber-based substrate to reach a quantity of dried coating from about 0.05 g/m$^2$ or about 7 g/m$^2$, or from 2 g/m$^2$ or about 7 g/m$^2$.

When the primer layer applied to the first surface comprise a PEI, a dried quantity of less than about 1 g/m$^2$, or from about 0.05 to about 0.20 g/m$^2$ and even from about 0.01 to about 0.16 g/m$^2$ may be sufficient. If the primer layer comprises PLA, a dried quantity of about 1 to about 5 g/m$^2$ or from about 2 to about 4 g/m$^2$ may be sufficient to provide a good adhesion of the polymeric film or laminated foil applied thereon.

The aqueous dispersion of the coating B, and the primer of the coating A when applied to the first surface, can be dried to reach a temperature on the surface of the coated substrate, at the exit of the drier, of from about 50° C. to about 85° C. For instance, the temperature on the surface of the coated substrate at the exit of the drier can be from about 70° C. to about 85° C. The drying conditions are set up to remove as much moisture as possible from the coated substrate while avoiding the formation of bubbles in the coating. A person skilled in the art will be able to adjust the temperature to optimize the drying.

The polymeric film applied to the first surface to form the coating A can be applied, depending on its nature as explained above, by extrusion or lamination. If a foil is to be applied, lamination is used.

In an embodiment, the polymeric film may be applied in a quantity from about 2.5 g/m$^2$ to about 250 g/m$^2$. In another embodiment, the polymeric film may be applied in a quantity from about 5 g/m$^2$ to about 30 g/m$^2$.

In one embodiment, the polymeric film is formed by providing the polymer(s) in the form of granules to the extruder. If the polymeric film comprises additives (e.g. mineral charges), a masterbatch polymer(s)/additives can be provided to the extruder. Alternatively, the granules of each of the constituents of the polymeric film can be provided separately to the extruder. In the extruder screw, the granules are then heated to allow melting thereof thereby forming a "liquid", somewhat viscous, coating which can then be extruded as a film through a die or extrusion head, directly to the surface of the cellulosic fiber based substrate or onto the primer layer if present. Another possible extrusion process utilizes two or more extruders to melt and deliver two or more constituents of the coating to a single extrusion head (die) which will extrude the coating as a film to the substrate surface. The heating temperature in the extruder is determined by the nature of the coating constituents and their melting temperature. A person skilled in the art will be able to determine the conditions to obtain a good quality film at the exit of the extrusion head.

As previously mentioned, in some embodiments, the polymeric film may be applied by lamination, such as when the film comprises PET, Nylon or is a metallized film. In some embodiments, the coating A comprises a foil, which may also be applied by lamination. In a particular embodiment, where the coating A comprises a laminated polymeric film or a laminated foil, a PE film may be laminated on the substrate's surface before lamination of the polymeric film or foil. The PE film may comprise EMA, EAA or EEA. In an embodiment, the PE film comprises 75 wt % LDPE and 25 wt % EMA, EAA or EEA. In an embodiment, the PE is melted and applied on the substrate's surface using a laminator. The polymeric film is then applied against the PE film, while the PE is still in melted state. The polymeric film is applied against the PE film at the nip pressure point of the laminator, i.e. the contact point between a nip roll and a chill roll of the laminator. The pressure created at the nip pressure point brings the PE film and the polymeric film into intimate contact, while cooling the PE film. The pressure also promotes good adhesion of the PE to the substrate's surface.

EXAMPLES

Example 1: Impact of the Primer on the Adhesion of PLA

A trial was performed to determine the impact of the use of a primer coating made of a waterborne extrusion primer for polyester on the adhesion of a PolyLactic Acid (PLA). In this trial, about 4 g/m² dry of MICA R-1509-B (from Mica Corporation) was applied as a pre-coat on the board side (not on the clay coated side) of two boards (MetsaBoard™ 17 mil and Atlas™ 21 mil). Some areas where coated with MICA R-1509-B and some not. Scrapers were used between the application roll and the sheet to create uncoated and coated stripes. Then, a mixture PLA and PBAT (Ecovio® PS 1606 from BASF) was applied on areas with and without MICA R-1509-B.

For the sample of PLA coated MetsaBoard™ 17 mil, the PLA film is hard to delaminate from the portions of the substrate which have not been pre-coated with MICA, but when it does, only a weak quantity of substrate's fibers are teared apart (qualitative delamination tests). On the portions of the sample pre-coated with MICA, the PLA film adhesion is very strong.

For the sample of PLA coated Atlas™ 21 mil, the PLA adhesion to the portions of the substrate which have not been pre-coated with MICA is lower than adhesion to the portions of the substrate pre-coated with MICA, in the tested condition. On portions of the substrate pre-coated with MICA, the PLA has a strong adhesion.

Example 2: Impact of Coating B on the Adhesion of PLA

Trials were performed to determine the impact of coatings on both surfaces of the substrate on the adhesion of a polylactic acid (PLA). In those trials, MICA R-1509-B (from Mica Corporation) was applied as a pre-coat on the board side of boards (MetsäBoard™ 12 pt, 215 g/m², and 18 pt, 310 g/m², hereafter referred to as Metsäboards). Then, PLA (Ecovio® PS 1606 from BASF) was applied on the pre-coated MICA R-1509-B.

To determine the impact a coating applied to the other side of the substrate (coating B) on the adhesion of PLA, Metsäboards with or without coating were applied against the Metsäboards coated with pre-coating MICA R-1509-B and PLA (coating A). Metsäboards with coating A and Metsäboards with or without coating B were heat sealed, with coating A and B facing each other when present, under various temperature and pressure conditions, and during different periods of time. Two operational conditions were tested: "cup stock" condition (high pressure and temperature during a short time) or "Roll header" conditions (lower pressure and temperature during a longer time). Two quantities of coating and two basis weights of substrate were tested. The coating of the second board (coating B) was also MICA R-1509-B. Therefore in those trials, the primer and the coating B are the same (i.e. MICA R-1509-B). The conditions and results are described in Table 4.

TABLE 4

| Coating A | Coating B | Conditions Basis weight Pressure Temperature Time Coating quantity | Adhesion |
|---|---|---|---|
| PLA-MICA | MICA | Cup stock | Strong |
| PLA-MICA | MICA | 215 g/m² | Medium-Strong |
| PLA-MICA | None | 24 psi | Medium |
| PLA-MICA | None | 375° C. | Medium |
| | | 1 s | |
| | | 4 g/m² | |
| PLA-MICA | MICA | Roll header | Strong |
| PLA-MICA | None | 215 g/m² | Very weak |
| | | 5 psi | |
| | | 191° C. | |
| | | 7 s | |
| | | 4 g/m² | |
| PLA-MICA | MICA | Cup stock | Strong |
| PLA-MICA | None | 310 g/m² | Very weak |
| | | 24 psi | |
| | | 375° C. | |
| | | 1 s | |
| | | 2 g/m² | |
| PLA-MICA | MICA | Roll header | Strong |
| PLA-MICA | MICA | 310 g/m² | Strong |
| PLA-MICA | None | 5 psi | None |
| | | 191° C. | |
| | | 7 s | |
| | | 2 g/m² | |

The adhesion of PLA was higher when using the substrates that have been coated with MICA R-1509-B (i.e. with a coating B) than the substrates that have not been coated. Those trials show that the use of coatings on both surfaces of the substrate (or board) improves the adhesion of the PLA for both "Cup Stock" and "Roll header" conditions. It appears that the differences are smaller for "Cup Stock" conditions. That may be explained by the fact that higher temperature and pressure conditions would increase the adhesion of the PLA in any case.

In addition, the quantity of coating applied on the substrate does not seem to have a very critical impact of the adhesion of the PLA in the range of quantities tested.

Example 3: Roll Blocking Tests

Rolls of coated paper, because they are generally tightly wound may block when unrolled. "Roll blocking" is a defect where the superposed film layers adhere together. Trials were performed to determine the impact of the quantity of coating and pre-coating applied on the substrate, as well as of the use of a coating on both sides of the substrate, on "Roll blocking". As for example 2, MICA R-1509-B (from Mica Corporation) was applied as a pre-coat on the board side of boards (MetsäBoard™ 12 pt, 215 g/m$^2$, and 18 pt, 310 g/m$^2$, hereafter referred to as Metsäboards). Then, PLA (Ecovio® PS 1606 from BASF) was applied on the pre-coated MICA R-1509-B.

Second Metsäboards with or without coating B were applied against Metsäboards coated with pre-coating MICA R-1509-B and PLA (coating A), and the combined Metsäboards were submitted to "blocking condition" (with lower temperature and pressure and during a larger time than for "cup stock" or "Roll header" conditions). Two quantities of PLA and two basis weights of substrate were tested. The coating of the second Metsäboard (coating B) was also MICA R-1509-B. The conditions and results are described in Table 5.

TABLE 5

| Coating A | Coating B | Conditions<br>Basis weight<br>Pressure<br>Temperature Time<br>Coating quantity | Blocking |
|---|---|---|---|
| PLA-MICA | MICA | 215 g/m$^2$ | Strong |
| PLA-MICA | MICA | 5 psi | Medium-Strong |
| PLA-MICA | None | 70° C. | Weak |
| | | 5 min | |
| | | 4 g/m$^2$ | |
| PLA-MICA | MICA | 310 g/m$^2$ | None-Weak |
| PLA-MICA | MICA | 5 psi | Weak |
| | | 70° C. | |
| PLA-MICA | None | 5 min | None-Weak |
| | | 2 g/m$^2$ | |

According to the results of Table 5, "Roll blocking" is lower, and may even be absent, for substrates coated with 2 g/m$^2$ of coating than for substrates coated with 4 g/m$^2$ of coating.

Example 4: Cup Stock Analysis

Several physical properties were evaluated on "cup stocks" made from Canadian Spring 5573 from Genpak coated with PLA Ecovio® (BASF) (coating A) and MICA R-1509-B (coating B). Physical properties reported in Table 6 include roughness, stiffness, thickness, brightness, edgewise compression resistance and Z-direction tensile strength.

TAPPI Standard Test Method No. T 410 om–13 was used to determine the grammage or the mass per unit area of the "cup stock". TAPPI Standard Test Method No. T 525 om–12 was used to determine the diffuse brightness of the "cup stock".

The edgewise compression resistance was evaluated using the ring crush resistance test. TAPPI Standard Test Method No. T 822 om–16 was used to measure the dynamic compression strength of the container. The edgewise compression resistance is a significant measurement as the containers are subjected to loads. It is thus highly related to performance characteristics and quality of a finished "cup stock".

The internal bond strength of the "cup stock" was measured using the TAPPI Standard Test Method No. T 541 om–10. The Z-direction tensile strength of the "cup stock" provides an indication of expected performance, e.g., strength of board in relation to glue bonding at "cup stock" side seams, and possible delamination on scoring, or use of high tack coatings.

TAPPI Standard Test Method No. T 538 om–16 was used to determine the relative roughness (Sheffield units or SU) of the "cup stock" by the Sheffield method. The purpose of this test is to measure the extent to which the surface of a sample deviates from a plane, as affected by the depth, width and number of departures from that plane. The relative roughness influence on the printing quality and properties such as the coefficient of friction, gloss, and coating absorption and adhesion.

TAPPI Standard Test Method No. T 556 om–16 was used to determine the bending resistance (mN) of the "cup stock" by the single-point bending method. The bending resistance measurement was performed on a L&W (Lorentzen & Wettre products) bending tester which was set to reach a deflection end-point at 15°±0.1° of bending with a clamping length of 50 mm on a 38 mm (1.5 in.) wide and 76 mm long vertically clamped sample. Stiffness is reported in Table 6. Bending resistance and stiffness are related to the modulus of elasticity of the product and its thickness and are indicative of paper-based containers' rigidity.

TAPPI/ANSI Standard Test Method No. T 494 om–13 was used to evaluate tensile strength value, tensile stiffness, tensile index, percentage elongation, and TEA (Tensile Energy Absorption) value of the "cup stock".

The physical properties experimental results mentioned above are provided in Table 6. The target values presented in Table 6 represent the industrial standard for this application.

TABLE 6

| Physical properties and units | | Target[1] | Cup of coffee |
|---|---|---|---|
| Total basis weight | g/m$^2$ | 327 | 325 ± 2 |
| Total thickness | μm | 450 | 453 ± 2.6 |
| Brightness | Back (% ISO) | — | 79.01 ± 0.26 |
| Ring crush MD | lbf/6 in | 200 | 158.2 ± 3.8 |
| Ring Crush index | lbf/6 in*MSF/lb | 2.99 | 2.38 ± 0.06 |
| ZDT | kPa | 517 | 459.8 ± 9.0 |
| Roughness | SU (Top) | 200 | 215 ± 25 |
| | SU (Back) | 200 | 209 ± 22 |
| Stiffness (15°, 50 mm) | MD (mN) | 470 | 477 ± 19 |
| | MD Taber | 231 | 234 ± 1 |
| | CD(mN) | — | 221 ± 3 |
| | CD Taber | — | 109 ± 1 |
| Springback (calculated) | — | — | 27 |
| FCEA (calculated) | J/m$^2$*m$^2$/kg | 4.9 | 3 |
| FCEA index (calculated) | J/m$^2$*m$^2$/kg | >10 | 9 |

Heat and liquid resistance were evaluated on 50 of the above-mentioned "cup stock". Trials were performed to determine the quality of the side seam, the bottom and the rim of the "cup stock". The resistance to hot coffee was evaluated for a period of 30 minutes to evaluate the penetration of coffee in the 3 critical zones of the cup mentioned above. Penetration was observed in the side joint typically over the filling level. The evolution of penetration over time was recorded over more than 2 hours and the penetration was found to increase progressively with time. No penetration was observed in the joint between the bottom of the cup stock and the bottom knurled flap.

Figure 6A:
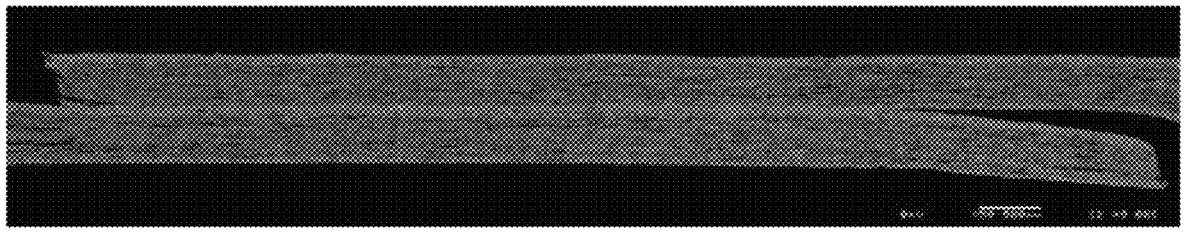
FIG. 6 comprises FIG. 6A to FIG. 6C which are scanning electron microscopy images performed on the different critical zones of the "cup stock" side seam (A), the joint between the bottom cup stock and the bottom knurled flap (B), and the rim (C).
Figure 6B:
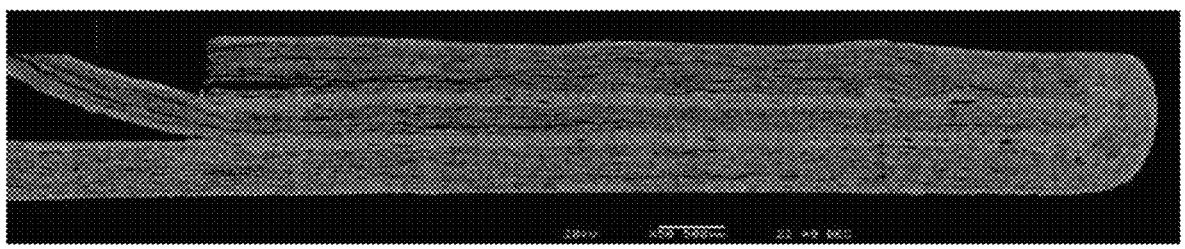
Figure 6C:
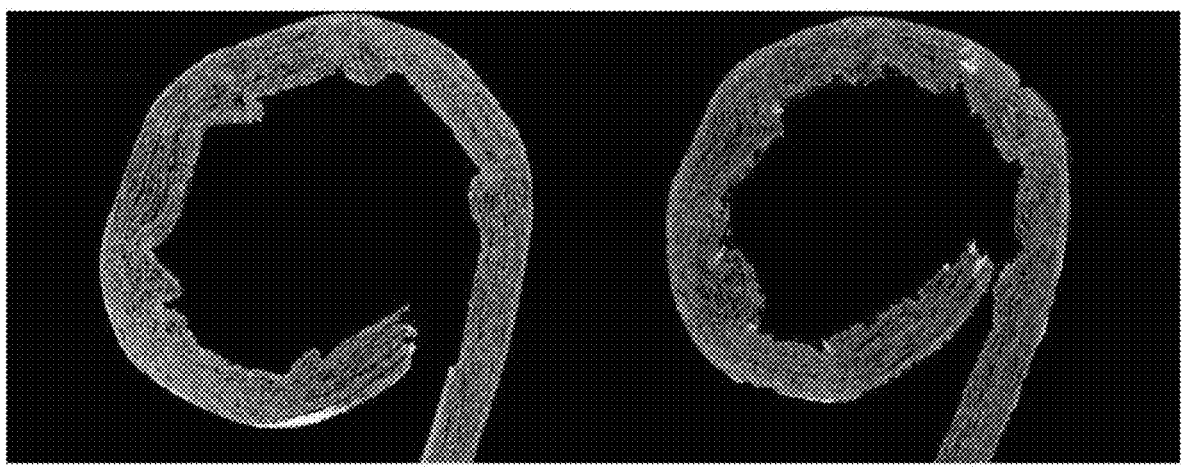

Scanning electron microscopy (SEM) analysis was performed on the three different critical zones of the "cup stock". According to the results, adhesion of PLA on the side seam or joint is adequate for all coffee cup samples, an example of this suitable adhesion is presented in FIG. 6A. The scale bar on FIG. 6A represents 500 µm, with a zoom of X50. The image was recorded at an accelerating voltage of 0 kV. According to FIG. 6B, the joint between the bottom cup stock and the bottom knurled flap also displays a satisfactory adhesion of the PLA. The image was recorded at an accelerating voltage of 20 kV. As can be observed on FIG. 6C, the rim shape is regular and circular without delamination. FIG. 6C was recorded at an accelerating voltage of 20 kV. SEM analysis demonstrated satisfactory adhesion in the three critical zones of the "cup stock".

Example 5: Impact of the Nature of the Aqueous Dispersion (Coating B) on the Adhesion of (Coating A)

Assays were performed to assess the impact of the aqueous dispersion nature (coating B) on adhesion of a polylactic acid (PLA) or low-density polyethylene (LDPE) (coating A). The aqueous dispersions (coating B) were separated in five categories including acrylic- or acrylate-based polymers or copolymers, styrene-butadiene copolymers, emulsified waxes (e.g. paraffin or polyethylene waxes), aqueous dispersion further comprising emulsified waxes, and aqueous dispersion further comprising mineral charges.

Coating B was applied on the board (Ecotech, Sonoco Trend Valley,) (grade 02151.016 EcoTect CLF-Z, 16 pt, basis weight 281 g/m$^2$). Coating A either PLA (Ecovio® PS 1606 from BASF) or LDPE (MarFlex® 1017 from Chevron Phillips) was then applied. The Ecotech board was heat sealed with coating A and B facing each other. Heat-sealing was performed with a heat-sealer (12-AS/1 de Sencorp Systems, Inc.). The two operational conditions mentioned in Example 2 were tested. In the "cup stock" condition, the applied temperature was 375° C. and the applied pressure was 24 psi for a duration of 1 sec. In the "Roll header" condition, the applied temperature was 191° C. and the applied pressure was 5 psi for a duration of 7 sec. Heat-sealing aptitude or blocking resistance of the two coatings was qualitatively evaluated by the manual delamination test described in Example 1. The heat-sealing aptitude was considered strong at percentages >80%, medium at percentages between 30% and 80% and weak at percentages <30%.

TAPPI/ANSI Standard Test Method No. T 410 om–13 was used to determine the mass per unit area of the board (grammage). Water absorptiveness (Cobb test) and grease resistance (3M kit test) were also measured. The Cobb test was performed according to TAPPI/ANSI Standard Test Method No. T 441 om–13 and the grease resistance determined according to TAPPI Standard Test Method No. T 559 cm–12. The polymer surface energy was measured using the ACCU DYNE TEST™. This test uses solutions of 2-ethoxyethanol and formamide to determine wetting characteristics of the subject material. The polymer surface energy is directly related to the ability of a substrate to anchor inks, coatings, or adhesives. The surface energy is expressed as "force/length" in dyne/cm.

Acrylic- or Acrylate-Based Aqueous Dispersion

Tests were performed to measure the impact of an aqueous dispersion of acrylic- or acrylate-based polymers or copolymers (coating B) on the adhesion of coating A.

In these tests, Epotal® S440 (BASF), MICA R-1509-B (Mica Corporation), Acronal® S504 (BASF), Spectra-Guard™ 3003 and Actega® X22 were used as coating B. The results for a "reference" sample, i.e. Ecotech board plus coating A but without coating B, are also provided. Additionally, impact of the quantity of coating applied on the sample on adhesion of coating A was also investigated using the Spectra-Guard™ 3003 as a coating B. The conditions and results are described in Table 7.

TABLE 7

| Board | Ecotech, Sonoco Trend Valley | Ecotech, Sonoco Trend Valley | Ecotech, Sonoco Trend Valley | Ecotech, Sonoco Trend Valley | Ecotech, Sonoco Trend Valley | Ecotech, Sonoco Trend Valley | Ecotech, Sonoco Trend Valley |
|---|---|---|---|---|---|---|---|
| Coating | Reference | Epotal S440 | Mica | Acronal 504 | SG 3003 | SG 3003 (50%) | Actega x22 |
| Parameters for draw down | — | Rod 0, poids #4 | Rod 0, poids #4 | Rod 0, poids #4 | Rod 0, poids #4 | Rod 0, poids #4 | Rod 0, poids #4 |
| % solids | — | 48.0 | 53.6 | 44.7 | 42.9 | 21.5 | 31.8 |
| Coating Weight (g/m$^2$) | — | 8.2 | 8.7 | 6.4 | 7.5 | 3.2 | 5.8 |
| Heat Sealing Aptitude on PLA, Cup stock Conditions (375° C., 24 psi, 1 sec) | Medium-Strong | Strong | Strong | Strong | Strong | Strong | Strong |
| Heat Sealing Aptitude on LDPE Cup Stock Conditions (375° C., 24 psi, 1 sec) | Weak | Light Blocking | Blocking | Blocking | Light Blocking | Blocking | Blocking |

TABLE 7-continued

| Heat Sealing Aptitude on PLA Headers conditions (191° C., 5 psi, 1 secs) | Medium | Medium-Strong | Strong | Strong | Strong | Strong | Medium-Strong |
|---|---|---|---|---|---|---|---|
| Kit 3M | <1 | — | 6 | — | 4 | 1 | — |
| Cobb (30 min) (g water/m$^2$) | 109 | — | — | 70 | 97 | — | — |
| Surface Energy (Dyne/cm) | >60 | 0 | 36 | 56 | >60 | | |

As expected from chemical affinities, adhesion of PLA was higher when using the substrates that have been coated with an acrylic- or acrylate-based aqueous dispersion (coating B) in comparison to the reference sample. This category of coating B does not aid the adhesion of LDPE. The quantity of coating as shown in these results has a significant impact on the water absorptiveness and grease resistance.

Emulsified Waxes

Tests were performed to determine the impact of using emulsified waxes such as paraffin or polyethylene waxes (coating B) on the adhesion of coating A. In these tests, Aquaban® 9001 A, HydraBan® 708, and Aquacer® 1061 were used as coating B. The conditions and results are described in Table 8.

TABLE 8

| Board | Ecotech, Sonoco Trend Valley | Ecotech, Sonoco Trend Valley | Ecotech, Sonoco Trend Valley | Ecotech, Sonoco Trend Valley | Ecotech, Sonoco Trend Valley |
|---|---|---|---|---|---|
| Coating | Reference | Aquaban 9001A | Hydraban 708 | Aquacer 1061 | Aquacer 1061 |
| Parameters for draw down | — | Rod 0, poids #4 | Rod 0, poids #4 | Rod 0, poids #4 | Rod 14, poids #4 |
| % solids | — | 49.7 | 46.7 | 31.6 | 31.6 |
| Coating Weight (g/m$^2$) | — | 6.3 | 5.7 | 3.8 | 7.7 |
| Heat Sealing Aptitude on PLA, Cup stock Conditions (375° C., 24 psi, 1 sec) | Medium-Strong | Medium | Medium-Strong | Blocking | Blocking |
| Heat Sealing Aptitude on LDPE Cup Stock Conditions (375° C., 24 psi, 1 sec) | Weak | Blocking | Medium | Strong | Strong |
| Heat Sealing Aptitude on PLA Headers conditions (191° C., 5 psi, 1 secs) | Medium | Strong Blocking | Medium | Blocking | Blocking |
| Kit 3M | <1 | 6 | — | >1 | >1 |
| Cobb (30 min) (g water/m$^2$) | 109 | — | — | 81.5 | 64 |
| Surface Energy (Dyne/cm) | >60 | 34 | — | 50 | 46 |

As can be appreciated from these results, adhesion of LDPE may be improved by the presence of emulsified waxes.

Aqueous Dispersions Further Comprising Emulsified Waxes

Tests were also performed to evaluate the impact of polymeric films further comprising emulsified waxes (e.g. paraffin or polyethylene waxes) as coating B on the adhesion of coating A.

In these tests, X300AF, Spectra-Guard™ 3005 and 3007, and Vaporcoat 2200R were used as coating B. Additionally, the effect of the quantity of coating applied on the sample, on the adhesion of coating A was also investigated. The conditions and results are described in Table 9.

TABLE 9

| Board | Ecotech, Sonoco Trend Valley | Ecotech, Sonoco Trend Valley | Ecotech, Sonoco Trend Valley | Ecotech, Sonoco Trend Valley | Ecotech, Sonoco Trend Valley | Ecotech, Sonoco Trend Valley | Ecotech, Sonoco Trend Valley | Ecotech, Sonoco Trend Valley | Ecotech, Sonoco Trend Valley |
|---|---|---|---|---|---|---|---|---|---|
| Coating | Reference | X3000AF | X3000AF | SG 3005 | SG 3005 | SG 3007 | SG 3007 | Vaporcoat 2200R | Vaporcoat 2200R |
| Parameters for draw down | — | Rod 0, poids #4 | Rod 10, poids #4 | Rod 0, poids #4 | Rod 18, poids #4 | Rod 0, poids #4 | Rod 18, poids #2 | Rod 0, poids #4 | Rod 10, poids #4 |
| % solids | — | 38.2 | 38.2 | 23.4 | 23.4 | 22.9 | 22.9 | 39.0 | 39.0 |
| Coating Weight (g/m$^2$) | — | 4.4 | 8.5 | 4.5 | 7.9 | 3.6 | 8.1 | 5.3 | 8.4 |

TABLE 9-continued

| | | | | | | | | | |
|---|---|---|---|---|---|---|---|---|---|
| Heat Sealing Aptitude on PLA, Cup stock Conditions (375° C., 24 psi, 1 sec) | Medium-Strong | Medium-Strong | Medium | Strong | Strong | Strong | Weak | Strong | Medium-Strong |
| Heat Sealing Aptitude on LDPE Cup Stock Conditions (375° C., 24 psi, 1 sec) | Weak | Medium | Weak | Blocking | Blocking | Light Blocking | None | Blocking | Light Blocking |
| Heat Sealing Aptitude on PLA Headers conditions (191° C., 5 psi, 1 secs) | Medium | Medium-Strong | Strong | Strong | Strong | Strong | Strong | Strong | Medium-Strong |
| Kit 3M | <1 | 5 | 7 | 4 | 7 | 6 | 9 | 6 | 7 |
| Cobb (30 min) (g water/m$^2$) | 109 | 39 | 16 | 44 | 9 | 69 | 16 | 55 | 28 |
| Surface Energy (Dyne/cm) | >60 | <30 | <30 | <30 | <30 | <30 | <30 | 30 | <30 |

Again, the quantity of coating as shown in these results has a significant impact on water absorptiveness and grease resistance. The quantity of X300AF coating may influence negatively the surface porosity of the sample, reducing the contact surface therefore reducing the heat-sealing aptitude on both PLA and LDPE in the cup stock conditions.

Aqueous Dispersion of Styrene-Butadiene Copolymers

A test was performed to evaluate the impact of styrene-butadiene copolymers as coating B on the adhesion of coating A. In this test, Styronal® 4606 was used as coating B. Styronal® 4606 is a copolymer of styrene-butadiene. The conditions and results are described in Table 10.

TABLE 10

| Board | Ecotech, Sonoco Trend Valley | Ecotech, Sonoco Trend Valley | Ecotech, Sonoco Trend Valley |
|---|---|---|---|
| Coating | Reference | Styronal 4606 | Styronal 4606 |
| Parameters for draw down | — | Rod 0, poids #4 | Rod 0, poids #4 |
| % solids | — | 50.0 | 50.0 |
| Coating Weight (g/m$^2$) | — | 6.9 | 11.0 |
| Heat Sealing Aptitude on PLA, Cup stock Conditions (375° C., 24 psi, 1 sec) | Medium-Strong | Strong | — |
| Heat Sealing Aptitude on LDPE Cup Stock Conditions (375° C., 24 psi, 1 sec) | Weak | Weak | Blocking |
| Heat Sealing Aptitude on PLA Headers conditions (191° C., 5 psi, 1 secs) | Medium | Strong | — |
| Kit 3M | <1 | 1 | — |
| Cobb (30 min) (g water/m$^2$) | 109 | — | — |
| Surface Energy (Dyne/cm) | >60 | 50 | — |

As expected from the chemical affinities, the adhesion of PLA was higher when using the substrates that have been coated with styrene-butadiene copolymers.

Aqueous Dispersion Comprising Mineral Charges

Tests were performed to determine the impact of mineral charges or pigments, such as calcium carbonate ($CaCO_3$), clay, mica, talc, titanium dioxide and/or carbon black (coating B) on adhesion of coating A.

In these tests, Michem®Coat 81 and 55 and Barrier-Grip R5701A which all contains mineral charges or pigments were used as coating B. The conditions and results are described in Table 11.

TABLE 11

| Board | Reference | Ecotech, Sonoco Trend Valley Barrier grip | Ecotech, Sonoco Trend Valley Barrier grip (50%) | Ecotech, Sonoco Trend Valley MC55 | Ecotech, Sonoco Trend Valley MC55 | Ecotech, Sonoco Trend Valley MC55 | Ecotech, Sonoco Trend Valley MC81 | Ecotech, Sonoco Trend Valley MC81 (50%) |
|---|---|---|---|---|---|---|---|---|
| Coating |  |  |  |  |  |  |  |  |
| Parameters for draw down | — | Rod 0, poids #4 | Rod 4, poids #4 | Rod 0, poids #4 | Rod 6, poids #4 | Rod 10, poids #4 | Rod 0, poids #4 | Rod 0, poids #4 |
| % solids | — | 47.8 | 23.9 | 53.3 | 53.3 | 53.3 | 52.0 | 26.0 |
| Coating Weight (g/m²) | — | 9.5 | 4.5 | 7.2 | 9 | 14 | 9.9 | 5.5 |
| Heat Sealing Aptitude on PLA, Cup stock Conditions (375° C., 24 psi, 1 sec) | Medium-Strong | Strong | Strong | Strong | — | — | Strong | Strong |
| Heat Sealing Aptitude on LDPE Cup Stock Conditions (375° C., 24 psi, 1 sec) | Weak | Medium-Strong | Strong Blocking | Blocking | Blocking | Blocking | Strong | Weak |
| Heat Sealing Aptitude on PLA Headers conditions (191° C., 5 psi, 1 secs) | Medium | Strong | Strong | Strong | — | — | Strong | Strong |
| Kit 3M | <1 | 4 | 1 | — | — | — | 5 | >1 |
| Cobb (30 min) (g water/m²) | 109 | 36 | 85 | — | — | — | 48 | 92 |
| Surface Energy (Dyne/cm) | >60 | 56 | >60 | — | — | — | >60 | >60 |

PLA and LDPE adhesion was higher when using substrates coated with a coating B containing mineral charges than substrates that have not been coated. Again, addition of mineral charges or pigments may affect roughness of the substrate surface therefore improving adhesion.

Table 12 displays the residue, at 600° C., of Michem®Coat 81, Michem®Coat 55 and Barrier-Grip R5701A, which is indicative of the percentage of mineral charges in the products.

TABLE 12

| Coating B | Residue at 600° C. |
|---|---|
| Michem ® Coat 55 | 24.43 |
| Michem ® Coat 81 | 53.19 |
| Barrier Grip R5701A | 52.76 |

A test was also performed to assess the effect of mineral charges or pigments addition in improving adhesion with LDPE. In this test, 51.8% of talc was added to Styronal® 4606. Conditions and results are described in Table 13.

TABLE 13

| Board | Reference | Ecotech, Sonoco Trend Valley Styronal 4606 | Ecotech, Sonoco Trend Valley Styronal 4606 | Ecotech, Sonoco Trend Valley Styronal 4606 with talc |
|---|---|---|---|---|
| Coating |  |  |  |  |
| Parameters for draw down | — | Rod 0, poids #4 | Rod 14, poids #4 | Rod 0, poids #4 |
| % solids | — | 50.0 | 50.0 | 60.0 |
| Coating Weight (g/m²) | — | 6.9 | 11.0 | 12.6 |
| Heat Sealing Aptitude on PLA, Cup stock Conditions (375° C., 24 psi, 1 sec) | Medium-Strong | Strong | — | Strong |
| Heat Sealing Aptitude on LDPE Cup Stock Conditions (375° C., 24 psi, 1 sec) | Weak | Weak | Blocking | Medium |

TABLE 13-continued

| | | | | |
|---|---|---|---|---|
| Heat Sealing Aptitude on PLA Headers conditions (191° C., 5 psi, 1 secs) | Medium | Strong | — | — |
| Kit 3M | <1 | 1 | — | — |
| Cobb (30 min) (g water/m$^2$) | 109 | — | — | — |
| Surface Energy (Dyne/cm) | >60 | 50 | — | — |

In Table 10, it was shown that adhesion of PLA was improved by the use of a coating B comprising Styronal® 4606. The information gathered in Table 14 indicates that the addition of mineral charges to Styronal® 4606 further improves the adhesion of LDPE.

Mixtures

Assays were performed to assess the impact of the mixing coatings that are successfully improving the adhesion of PLA with coatings that are efficaciously improving the adhesion of LDPE. This test was performed by adding 50% of Aquacer® 1061 to a Styronal® 4606 aqueous dispersion. The influence of MICA R-1509-B as an adhesion promotor to an Aquacer® 1061 coating and to an Aquaban® 9001A coating to improve the adhesion of PLA was also tested. This test was performed by adding 50% of MICA R-1509-B to a solution of Aquacer® 1061 and to a solution of Aquaban® 9001A. The conditions and results are described in Table 14.

TABLE 14

| Board | | Ecotech, Sonoco Trend Valley | Ecotech, Sonoco Trend Valley | Ecotech, Sonoco Trend Valley | Ecotech, Sonoco Trend Valley | Ecotech, Sonoco Trend Valley | Ecotech, Sonoco Trend Valley |
|---|---|---|---|---|---|---|---|
| Coating | Reference | Styronal | Styronal | Aquacer 1061 | Aquacer 1061 | Aquaban 9001A | Aquaban 9001A |
| Parameters for draw down | — | Rod 0, weight #4 | Rod 10, weight #4 | Rod 0, weight #4 | Rod 10, weight #4 | Rod 0, weight #4 | Rod 10, weight #4 |
| % solids | — | 42.4 | 42.4 | 41.1 | 41.1 | 50.0 | 50.0 |
| Coating Weight (g/m$^2$) | — | 5.0 | 8.4 | 5.0 | 9.4 | 6.4 | 7.5 |
| Heat Sealing Aptitude on PLA, Cup stock Conditions (375° C., 24 psi, 1 sec) | Medium-Strong | Strong | Strong | Strong | Strong | Strong | Medium |
| Heat Sealing Aptitude on LDPE Cup Stock Conditions (375° C., 24 psi, 1 sec) | Weak | Medium-Strong | Strong | Strong | Strong | Weak | Blocking |
| Heat Sealing Aptitude on PLA Headers conditions (191° C., 5 psi, 1 secs) | Medium | Strong | Strong | Strong | Strong | Strong | Strong |
| Kit 3M | <1 | 1 | 2 | 1 | 2 | 6 | 6 |
| Cobb (30 min) (g water/m$^2$) | 109 | 50.5 | 30 | 50 | 29 | 52 | 51 |
| Surface Energy (Dyne/cm) | >60 | 46 | 48 | 52 | 50 | 34 | 36 |

As expected from these mixtures, the adhesion of both the PLA and LDPE is improved, for instance, due to improved chemical affinities.

The above-described embodiments and examples are considered in respect only as illustrative and not restrictive, and the present application is intended to cover any adaptations or variations thereof, as apparent to a person skilled in the art. Of course, numerous other modifications could be made to the above-described embodiments without departing from the scope of the invention, as apparent to a person skilled in the art.

The scope of the invention is therefore intended to be limited solely by the scope of the appended claims.

The invention claimed is:

1. A coated paper-based substrate for manufacturing a container, comprising a cellulosic fiber-based substrate coated on a first surface with a coating A forming an interior coating and coated on a second surface with a coating B forming an exterior coating, wherein the coating A comprises at least one layer of an extruded or laminated polymeric film or of a laminated foil;

the coating B comprises at least one layer obtained by applying an aqueous dispersion comprising at least one polymer or copolymer providing a water and/or moisture barrier to the second surface of the paper-based substrate once coated;

the extruded or laminated polymeric film and the polymer or copolymer of the aqueous dispersion are different; and the coating A and the coating B are heat sealable to each other.

2. The coated paper-based substrate of claim 1, wherein the aqueous dispersion comprises a polymer or copolymer selected from an acrylic- or acrylate-based polymer or copolymer, polyester, plant oil-based polyester resin, polyurethane, polyvinylidene chloride (PVDC), ethylene copolymer resin dispersion, paraffinic wax, styrene-butadiene copolymer, starch, dextrin, LDPE, HDPE, PLA, nylon, polypropylene and mixtures thereof.

3. The coated paper-based substrate of claim 1, wherein the aqueous dispersion further comprises mineral charges or pigments.

4. The coated paper-based substrate of claim 1, wherein the aqueous dispersion comprises an acrylic- or acrylate-based polymer or copolymer, styrene-butadiene copolymer, paraffin or polyethylene emulsified wax, or mixtures thereof.

5. The coated paper-based substrate of claim 1, wherein the surface tension of the coating B is from about 15 to about 60 dynes/cm.

6. The coated paper-based substrate of claim 1, wherein the extruded or laminated polymeric film comprises a PE, PLA, PBS, PP, PET, Nylon, PVDC, EvOH, or metallized film.

7. The coated paper-based substrate of claim 1, wherein the coating A comprises at least one layer of a film of LDPE or PLA.

8. The coated paper-based substrate of claim 1, wherein the coating A further comprises a primer layer between the first surface of the cellulosic fiber-based substrate and the layer of the extruded or laminated polymeric film or the laminated foil, wherein the primer layer comprises a water based emulsion or dispersion of polymers or copolymers selected from acrylic-based polymers, acrylate-based polymers, styrene-butadiene copolymers, styrene-acrylic copolymers, styrene-acrylic-acrylonitrile copolymers, polyethylene imines, functionalized polypropylenes, polyurethanes, polyesters, ethylene-acrylic acid copolymers, modified ethylene copolymers and any mixture thereof.

9. The coated paper-based substrate of claim 8, wherein the aqueous dispersion of the primer layer of the coating A comprises an aqueous dispersion which is the same as the dispersion of the coating B.

10. The coated paper-based substrate of claim 1, wherein the coating A comprises a primer layer of a water based dispersion of a styrene-butadiene copolymer, styrene-acrylic copolymer, styrene-acrylic-acrylonitrile copolymer or polyester-polyurethane elastomer and a layer of an extruded film of PLA.

11. The coated paper-based substrate of claim 1, wherein the cellulosic fiber-based substrate is a recycled or virgin liner, medium, fine paper, newspaper, chipboard, Kraftpak® paper, paperboard, molded pulp, bleached paper board or any other cellulosic fiber-based substrate, wherein the cellulosic fiber-based substrate is optionally coated.

12. The coated paper-based substrate of claim 1, wherein at least one of the aqueous dispersion or the extruded or laminated polymeric film further comprises mineral charges selected from calcium carbonate ($CaCO_3$), clay, mica, talc, titanium dioxide, and carbon black.

13. The coated paper-based substrate of claim 1, wherein the aqueous dispersion further comprises at least one additive selected from pigments, dyes, anti-foaming agents, dispersing agents, thickening agents, pH control agents, antioxidant agents, antimicrobial agents, and ethylene absorbers.

14. The coated paper-based substrate of claim 1, wherein the coating B further comprises an adhesion promotor selected from PEI, EMA, EEA, EAA, and LDPE.

15. The coated paper-based substrate of claim 1, wherein the coating B further comprises an adhesion promotor layer.

16. The coated paper-based substrate of claim 1, wherein the coating B further comprises an adhesion promotor provided as a water-based dispersion or a waterborne solution.

17. The coated paper-based substrate of claim 1, wherein the coating B has a surface tension greater than 38 dynes/cm.

18. The coated paper-based substrate of claim 1, wherein the extruded or laminated polymeric film comprises at least one additive selected from ethyl methacrylate, ethylene ethyl acrylate, and ethylene acrylic acid.

19. The coated paper-based substrate of claim 1, wherein the extruded or laminated polymeric film comprises PLA and polybutyrate adipate terephthalate.

20. The coated paper-based substrate of claim 1, wherein the extruded or laminated polymeric film comprises a metallized polymeric film having a metallized side and a polymeric side.

21. A process for preparing a coated paper-based substrate for manufacturing a container, wherein the coated paper-based substrate comprises a cellulosic fiber-based substrate coated on a first surface with a coating A forming an interior coating and coated on a second surface with a coating B forming an exterior coating providing a water and/or moisture barrier to the second surface of the paper-based substrate, and wherein
the coating A comprises at least one layer of an extruded or laminated polymeric film or of a laminated foil;
the coating B comprises at least one layer of at least one polymer or copolymer;
the extruded or laminated polymeric film and the polymer or copolymer of the aqueous dispersion are different; and
the coating A and the coating B are heat sealable to each other;
the process comprising:
applying an aqueous dispersion of the at least one polymer or copolymer;
drying the aqueous dispersion to form the at least one layer of the polymer or copolymer; and
applying by extrusion or lamination the layer of the polymeric film or laminating the foil on the first surface of the paper-based substrate.

22. The process of claim 21, wherein the aqueous dispersion comprises a polymer or copolymer selected from an acrylic- or acrylate-based polymer or copolymer, polyester, plant oil-based polyester resin, polyurethane, polyvinylidene chloride (PVDC), ethylene copolymer resin dispersion, paraffinic wax, styrene-butadiene copolymer, starch, dextrin, LDPE, HDPE, PLA, nylon, polypropylene and mixtures thereof.

23. The process of claim 21, wherein the aqueous dispersion further comprises mineral charges comprising calcium carbonate (CaCO3), clay, mica, talc, titanium dioxide and/or carbon black.

24. The process of claim 21, wherein the aqueous dispersion comprises an acrylic- or acrylate-based polymer or copolymer, styrene-butadiene copolymer, paraffin or polyethylene emulsified wax, or mixtures thereof.

25. The process of claim 21, wherein the surface tension of the coating B is from about 15 to about 60 dynes/cm.

26. The process of claim 21, wherein the extruded or laminated polymeric film comprises a PE, PLA, PBS, PP, PET, Nylon, PVDC or metallized film.

27. The process of claim 21, wherein the coating A comprises at least one layer of a film of LDPE or PLA.

28. The process of claim 21, further comprising applying a primer layer on the first surface of the paper-based substrate before applying the layer of the polymeric film or laminating the foil, wherein the primer layer comprises a water based emulsion or dispersion of polymers or copolymers selected from acrylic-based polymers, acrylate-based polymers, styrene-butadiene copolymers, styrene-acrylic copolymers, styrene-acrylic-acrylonitrile copolymers, polyethylene imines, functionalized polypropylenes, polyurethanes, polyesters, ethylene-acrylic acid copolymers, modified ethylene copolymers and any mixture thereof.

29. The process of claim 28, wherein the aqueous dispersion of the primer layer of the coating A and the aqueous dispersion of the coating B are the same and are applied simultaneously on the first surface and second surface of the cellulosic fiber-based substrate, respectively.

30. The process of claim 21, wherein the coating A comprises a primer layer of a water-based dispersion of a styrene-butadiene copolymer, styrene-acrylic copolymer, styrene-acrylic-acrylonitrile copolymer or polyester-polyurethane elastomer and a layer of an extruded film of PLA.

31. The process of claim 21, wherein the polymeric film is applied in a quantity from about 5 $g/m^2$ to about 30 $g/m^2$ and the aqueous dispersion of the coating B is applied to the second surface of the cellulosic fiber-based substrate to reach a quantity of dried coating of at most about 20 $g/m^2$.

* * * * *